(12) United States Patent
Jethmalani et al.

(10) Patent No.: US 8,753,551 B2
(45) Date of Patent: Jun. 17, 2014

(54) METHOD OF MANUFACTURING AN OPTICAL LENS

(75) Inventors: Jagdish M. Jethmalani, San Diego, CA (US); Laurence Warden, Poway, CA (US); Shui T. Lai, Encinitas, CA (US); Andreas W. Dreher, Escondido, CA (US)

(73) Assignee: Essilor International (Compagnie General d'Optique), Charenton Cedex (FR)

( * ) Notice: Subject to any disclaimer, the term of this patent is extended or adjusted under 35 U.S.C. 154(b) by 0 days.

(21) Appl. No.: 13/329,119

(22) Filed: Dec. 16, 2011

(65) Prior Publication Data
US 2012/0156397 A1    Jun. 21, 2012

Related U.S. Application Data

(62) Division of application No. 10/935,798, filed on Sep. 7, 2004, now abandoned.

(60) Provisional application No. 60/546,378, filed on Feb. 20, 2004, provisional application No. 60/520,065, filed on Nov. 14, 2003.

(51) Int. Cl.
*B29D 11/00*    (2006.01)

(52) U.S. Cl.
USPC ............ 264/1.7; 264/1.36; 264/2.5; 264/102; 427/162

(58) Field of Classification Search
USPC ......... 264/1.1, 1.7, 2.5, 1, 36, 1.38, 101, 102; 425/808; 427/162
See application file for complete search history.

(56) References Cited

U.S. PATENT DOCUMENTS

| | | | | |
|---|---|---|---|---|
| 4,873,029 | A | * | 10/1989 | Blum ........................... 264/1.32 |
| 5,531,940 | A | * | 7/1996 | Gupta et al. ................... 264/1.7 |
| 6,786,602 | B2 | | 9/2004 | Abitbol |
| 6,813,082 | B2 | | 11/2004 | Bruns |
| 7,036,931 | B2 | | 5/2006 | Lindacher et al. |
| 2002/0196412 | A1 | | 12/2002 | Abitbol |

FOREIGN PATENT DOCUMENTS

| | | |
|---|---|---|
| WO | WO 02/88830 | 11/2002 |
| WO | WO 2004/034095 | 4/2004 |

* cited by examiner

*Primary Examiner* — Mathieu D. Vargot
(74) *Attorney, Agent, or Firm* — Cozen O'Connor

(57) ABSTRACT

A method of manufacturing an optical lens that is configured to correct high order aberrations. One embodiment is a method of customizing optical correction in an optical system. The method includes measuring optical aberration data of the optical system. The method further includes calculating a lens definition based on the optical aberration data. Calculating the lens definition may include calculating a correction of at least one high order optical aberration. The method further includes fabricating a correcting lens based on the lens definition.

18 Claims, 16 Drawing Sheets

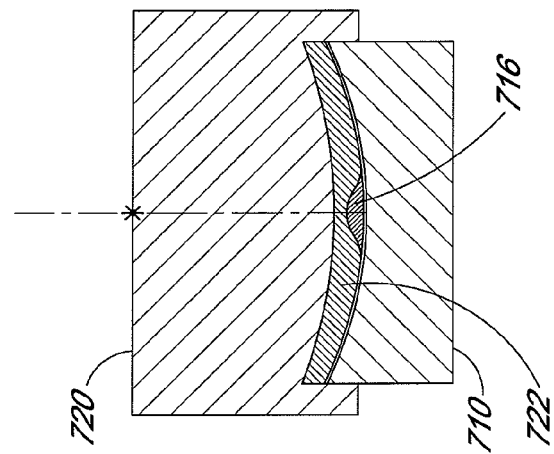
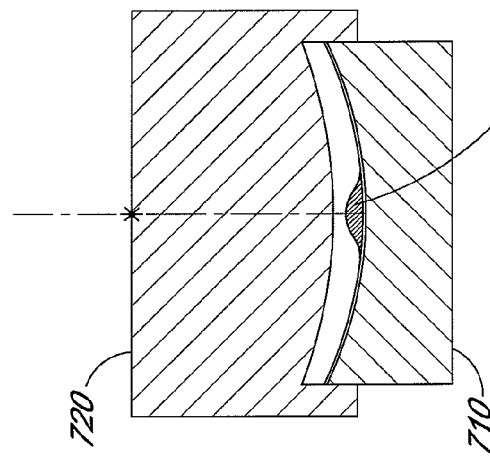
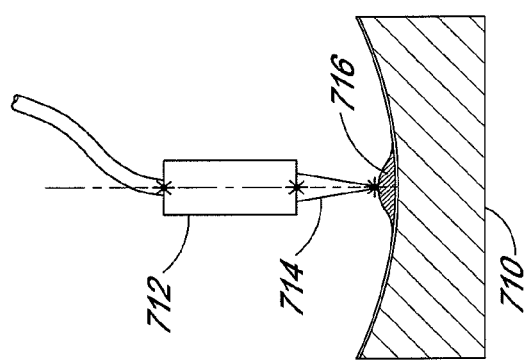
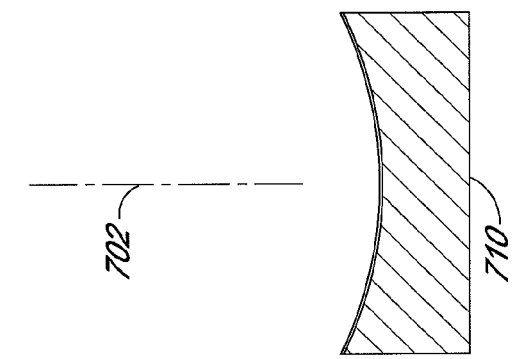

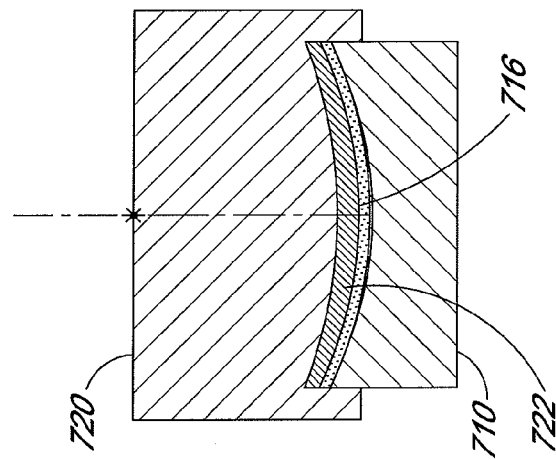
FIG. 7F   FIG. 7G   FIG. 7H   FIG. 7I
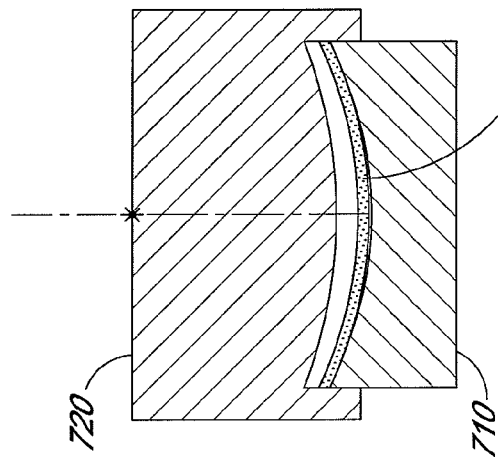
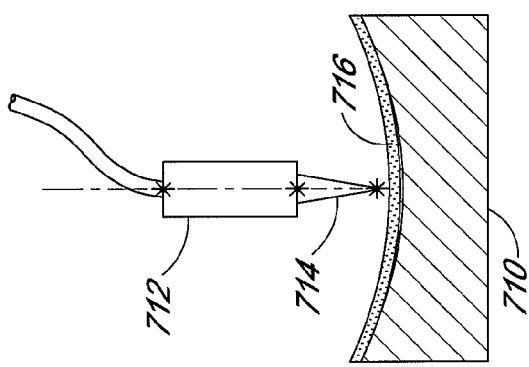
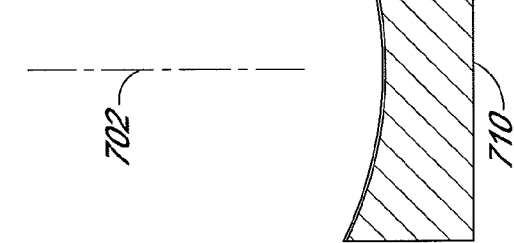
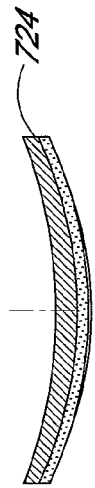
FIG. 7J

METHOD OF MANUFACTURING AN OPTICAL LENS

RELATED APPLICATIONS

This application is a divisional of U.S. Ser. No. 10/935,798 filed Sep. 7, 2004 now abandoned, which claims the benefit of U.S. Ser. No. 60/520,065 filed Nov. 14, 2003. This application also claims benefit of U.S. Ser. No. 60/546,378, filed on Feb. 20, 2004. The contents of these applications are incorporated herein by reference in their entireties.

BACKGROUND OF THE INVENTION

1. Field of the Invention

The present invention relates to systems and methods relating to manufacturing customized optical lenses for correcting aberrations of optical systems such as the human eye.

2. Description of the Related Art

The human eye, namely the cornea and lens, can exhibit a variety of optical aberrations that diminish the optical performance of the eye, resulting in blurred vision. The correction of blurred vision by fitting patients with lenses has typically been limited to the correction of low order aberrations only, such as defocus and astigmatism. Traditionally, high order aberrations, e.g. those describable with Zernike polynomials of the third order or higher, could not be corrected using lenses. In addition, due to lens manufacturing limitations and expenses, defocus and astigmatism are typically only corrected in discrete steps, with any correction being made to the nearest one quarter (0.25) diopter (D). Unfortunately, the resolution of one quarter (0.25) diopter results in incomplete vision correction.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include convenient and economical methods of manufacturing optical lens and lens blanks.

One embodiment is a method of customizing optical correction in an optical system. The method includes measuring optical aberration data of the optical system. The method further includes determining, based on the optical aberration data, a lens definition including a correction of at least one high order optical aberration. The method further includes fabricating a correcting lens based on the lens definition.

Another embodiment is a method of manufacturing a customized lens. The method includes measuring optical parameters of an optical system. The optical parameters may include measured optical aberrations. The method further includes forming a lens having at least one optical element. Forming the lens may include correcting a portion of the measured optical aberrations in the at least one optical element. The portion may include at least one low order aberration. Forming the lens may further include correcting at least one remaining optical aberration in the lens. The at least one remaining optical aberration may include a high order aberration.

Another embodiment is a method of making an optical lens. The method includes applying a spacer having a predetermined thickness to a first lens. The method further includes applying a curable material to a first lens. The method further includes debubbling the curable material to remove trapped gas. The method further includes positioning a portion of the curable material onto an off-center location of a second optical element and mating the second optical element and the first optical element. The mating may be performed so that the curable material forms a layer having a thickness defined by the predetermined thickness of the spacer. The curable material may be at least partially cured to form a semi-cured material. The curable material may be further cured to define a pattern of refractive index wherein the pattern of refractive index corrects at least one high order aberration in an optical path through the optical lens.

Another embodiment is a method of making an optical lens. The method includes dispensing a curable material to form a substantially planar sheet. The method further includes curing the curable material to form a semi-cured material wherein the index of refraction of said semi-cured material can be selectively varied. The method also includes applying at least a portion of the sheet to a first optical element. The method further includes affixing a second optical element to the first optical element and sealing the curable material therebetween. In one embodiment, the method may further include curing the semi-cured material to define a pattern of refractive index wherein the pattern of refractive index corrects at least one high order aberration in an optical path through the optical lens.

Another embodiment is a method of making a lens blank. The method includes mating a first optical element at a predetermined distance from a second optical element so as to form a cavity therebetween. The method further includes filling the cavity with a curable material and at least partially curing the curable material to form a semi-cured material.

Yet another embodiment is method of making an optical lens. The method includes forming a substantially planar sheet of gel. The method further includes applying at least a portion of the substantially planar sheet of gel to the at least one surface of the mold to form a first layer of material having a selectively variable index of refraction. The method further includes forming a second layer of material within the mold. In one embodiment, the method further includes curing the first layer of material to define a pattern of refractive index. The pattern of refractive index may correct at least one high order aberration in an optical path through the optical lens.

Another embodiment is a method of making an optical lens. The method includes forming a first layer of curable material within a mold. The curable material includes a mixture of materials having low and high refractive indices. The method further includes exposing the layer of curable material to a first pattern of radiation to define a first pattern of refractive index in the layer wherein the first pattern of refractive index corrects at least one high order optical aberration in an optical path through the optical lens. The method also includes exposing the layer of curable material to a second pattern of radiation to define a second pattern of refractive index in the layer wherein the second pattern of refractive index corrects at least one low order optical aberration in an optical path through the optical lens.

Another embodiment is a method of making an optical lens. The method includes filling a mold with a curable material. A pattern of refractive index to correct at least one optical aberration is calculated. The curable material is irradiated with a two dimensional grayscale pattern so as to form a first layer having defined therein the pattern of refractive index. Uncured material is removed from the mold. The mold is filled with a second layer of curable material. The second layer of curable material is cured within the mold.

Yet another embodiment is a method of making an optical lens. The method includes depositing a first layer of material on to at least one surface of a mold so as to define a pattern of refractive index. The pattern of refractive index corrects at least one high order aberration in an optical path through the optical lens. The method further includes forming a second layer of material within the mold. In one embodiment, depositing the layer of material includes depositing a varying thickness of the layer of material to define a pattern of varying thickness and wherein the pattern of varying thickness comprises the pattern of refractive index. In another embodiment, depositing the first layer of material comprises depositing a mixture of at least two materials wherein the mixture of the at least two materials is varied to define the pattern of refractive index.

Another embodiment is a method of making a customized lens. The method includes applying a layer of curable polymer to an optical element and selectively curing the layer to vary the thickness of the layer so as to define a pattern of refraction that corrects at least one optical aberration. The method may further includes substantially uniformly curing the layer.

Another embodiment is a method of making a customized lens. The method includes applying a layer of curable material to an optical element. The method further includes vacuum forming the layer of curable material to the optical element. The method also includes at least partially curing the layer of curable material. The method further includes selectively curing the layer of curable material to define a pattern of refraction in the layer that corrects at least one high order optical aberration in an optical path through the lens.

Another embodiment is a system for customizing optical correction in an optical system. The system includes means for measuring optical aberration data of the optical system, means for determining, based on the optical aberration data, a lens definition comprising a correction of at least one high order optical aberration, and means fabricating a correcting lens based on the lens definition.

BRIEF DESCRIPTION OF THE DRAWINGS

FIGS. 7A-7E graphically illustrate steps of making a lens, such as in the method depicted in FIG. 6.

FIGS. 7F-7J graphically illustrate steps of a method making a lens similar to the method depicted in FIGS. 7A to 7E, except that the layer has a generally uniform thickness and is composed of varying proportions of materials to vary the index of refraction across the surface of the lens.

DETAILED DESCRIPTION OF CERTAIN EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

Spectacle lens are typically formed by grinding the lens blank to correct the measured optical aberrations and edging a lens blank to fit a pair of spectacle frames. This correction is typically limited to low order aberrations. In addition, the corrections are typically incomplete in that grinding is typically performed to a margin of 0.25 D.

By using a device that measures wavefront aberrations in the eye of patient, much more precise measurements of a patient's eye can be obtained. The resulting measurements can be used to calculate an optimized lens definition. In one embodiment, the lens definition can define a pattern of refractive index that corrects one or more optical aberrations in an optical path through the lens that, when manifested in an optical lens, such as a spectacle lens, corrects the wavefront aberrations of the patient more precisely than is typically possible. Patients will thus be able to see at very near the peak of their own optical capabilities.

It is to be appreciated that, as used herein, "correction" of optical aberrations does not necessarily mean that the optical aberrations are completely eliminated but, rather, is to be understood to generally mean reducing, minimizing, or optimizing the optical aberrations. Moreover, because in some instances increasing certain high order aberrations has been found to improve vision, "correction" of aberrations can also include adding or increasing certain optical aberrations. An optical element may include a thick or thin lens blank, a plano lens, a corrective lens such as a spectacle lens, a contact lens, an optical coating, an intraocular lens, or any other light transmissive component including combinations of other optical elements. A plano optical element, i.e., one that does not possess any refractive power, may be flat, or may have a curve for cosmetic reasons, e.g. to have an appearance mimicking a standard spectacle lens.

Figure 1:
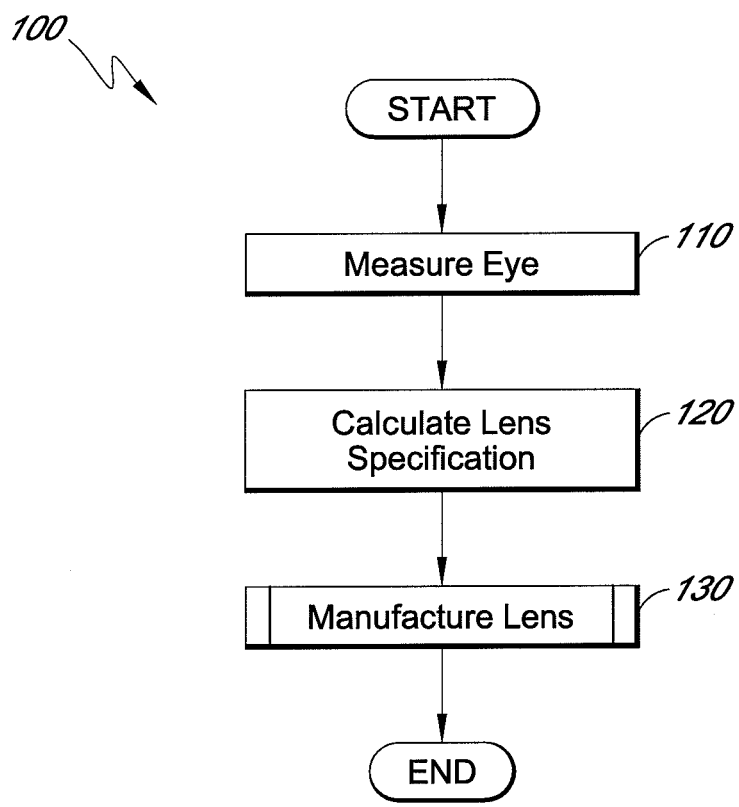
FIG. 1 is a flow chart depicting a process for producing a spectacle lens.

FIG. 1 is a top level flow chart illustrating a method 100 of making customized lens. Beginning at a step 110, a patient's eye is measured. In one embodiment, the patient's vision parameters, such as low order and/or high order aberrations are measured using an aberrometer (comprising a wavefront sensor, for example). The aberrations can be measured using a wavefront sensor, such as a Shack-Hartmann, diffraction grating, grating, Hartmann Screen, Fizeau interferometer, ray tracing system, Tscherning aberrometer, skiascopic phase difference system, Twymann-Green interferometer, Talbot interferometer, for example. Exemplary aberrometers are described in more detail in U.S. Pat. No. 6,721,043 to Platt. B. et. al. in "Light Adjustable Aberration Conjugator", which is hereby incorporated by reference in its entirety. Other embodiments of an aberrometer are disclosed in U.S. patent application Ser. No. 10/076,218, entitled "APPARATUS AND METHOD FOR DETERMINING OBJECTIVE REFRACTION USING WAVEFRONT SENSING," filed Feb. 13, 2002; and U.S. patent application Ser. No. 10/014,037, entitled "SYSTEM AND METHOD FOR WAVEFRONT MEASUREMENT," filed Dec. 10, 2001, each of which is hereby incorporated by reference in its entirety. In one embodiment, the vision parameters may include data obtained by testing the patient's vision through a trial, or test, lens that is configured to correct one or more high or low order optical aberrations.

In addition to measuring aberrations, other vision parameters can be obtained such as the patient's vertex distance, pupil size, pupil distance, frame information, gaze, or x-y tilt. Further details of taking such measurements are described in U.S. Pat. No. 6,682,195, entitled "CUSTOM EYEGLASS MANUFACTURING METHOD," issued on Jan. 27, 2004, which is hereby incorporated by reference in its entirety.

Moving to step 120, a pattern of refraction in an optical lens is calculated to correct the measured aberrations. The pattern of refraction can be effected in an optical element by, for example, defining a two dimensional pattern of refractive index across the face of the optical element or by varying the thickness of a layer of material comprising the optical element to vary the refractive index and thereby define the pattern of refraction. For example, standard spectacle lens typically defines a pattern of refraction by varying the curvature of the lens material, and thus the thickness of the lens material, over the surfaces of the lens. The curvature of the lens, along with the refractive index of the lens material, defines the pattern of refraction of the standard spectacle lens. Such standard lenses typically correct one or more low order optical aberrations. In one embodiment, the pattern of refraction is at least partially defined in terms of sphere, cylinder, and axis. In such an embodiment, a further pattern of refraction for correcting high order aberrations and residual aberrations resulting from, for example, grinding errors can be further calculated for application to the lens. In other embodiments, the pattern of refraction can be calculated in terms of low and high order Zernike polynomials for application to a material that can be processed or cured to alter its refractive index.

In one embodiment, the vision parameters are used by a vision metric to optimize the lens definition. The lens definition can include the wavemap, a pattern of refraction, a prescription in terms of sphere, cylinder, and axis, or any other relation to a pattern of refraction or correction. In addition, the lens definition may include an optical center, multiple optical centers, single correction zones, multiple correction zones, transition zone, blend zone, swim region, channel, add zones, vertex distance, segmental height, off-axis gaze zone, logos, invisible markings, etc.

Next at step 130, a lens is manufactured to correct both low and high order optical aberrations. One embodiment of such a lens is disclosed in more detail in U.S. patent application Ser. No. 10/218,049, entitled "APPARATUS AND METHOD OF CORRECTING HIGH ORDER ABERRATIONS OF THE HUMAN EYE," filed Aug. 12, 2002, herein incorporated by reference in its entirety. Embodiments of methods of manufacturing the lens may include number of different methods for forming a lens having a calculated pattern of refractive index, such as are described in more detail herein, including depositing of a layer that is cured to include the calculated pattern of refraction, grinding or freeform surfacing of a lens surface, cast molding and combinations thereof.

Figure 2:
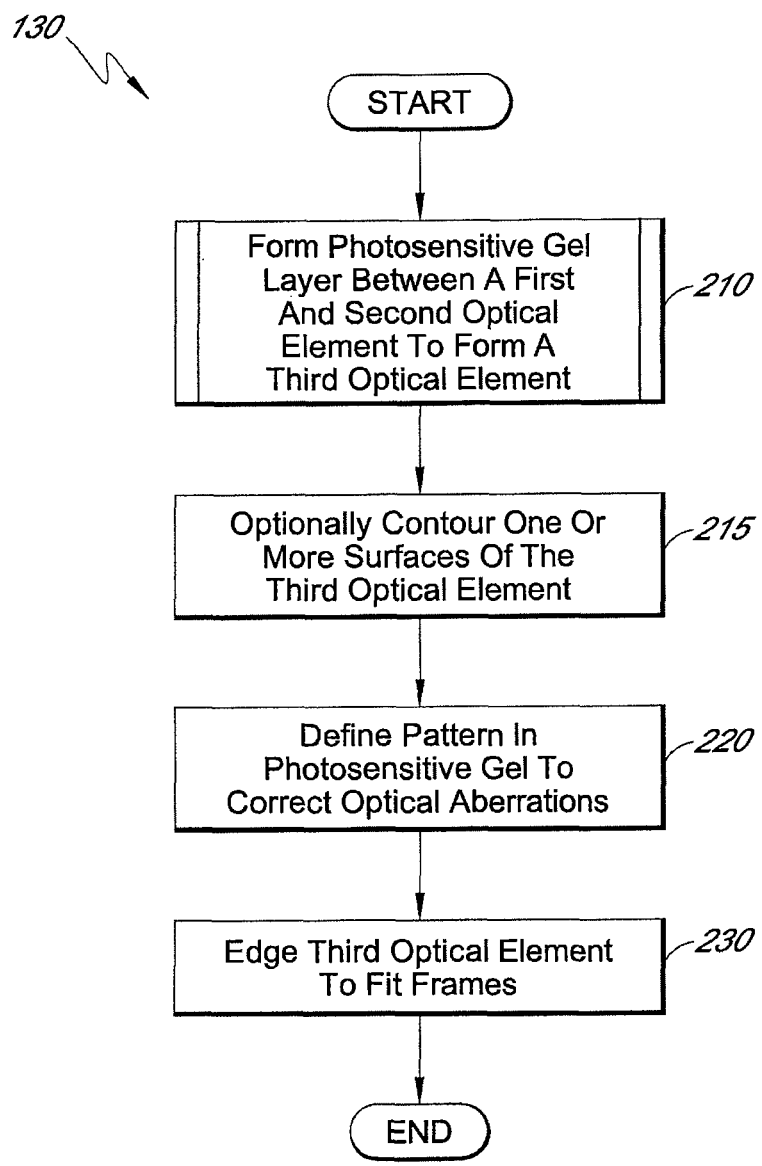
FIG. 2 is a flow chart depicting an embodiment of a method of manufacturing a lens for correcting optical aberrations as part of the process of FIG. 1.

FIG. 2 is a flow chart depicting one embodiment of a method 130 of manufacturing optical lens blank that can receive a pattern of refractive index that is calculated based on the wavefront aberrations from, e.g., a human eye. The method 130 begins at a step 210, where a photosensitive gel layer is formed between a first and second optical element. In one embodiment is a thick and thin lens. Other embodiments can include two thick lenses or two thin lenses. A thick optical lens is generally thicker, can be plano, and generally refers to an optical element that can provide corrective power. While either a thick or thin lens can be contoured to change the refractive power of the element, the thicker lens provides a greater range for contouring. Such contouring can include grinding and polishing, laser ablation, or freeform surfacing. Desirably, the front optical element, the one on which light into the eye is initially incident, is a thin lens that generally provides no power. Note that the radius of curvature of the front optical element generally defines the refractive power of the optical lens blank. The selection of a thick or thin lens for each optical element can be made on the basis of the desired corrective power of the final optical blank. For example, if a higher power lens is desired, two thick lenses can be used. If only minimal low order correction is desired in a particular lens, two thin lenses may be used.

The photosensitive gel layer can be selectively cured to vary its index of refraction. For example, it can be cured in a pointwise, stepwise, or continuous manner to define a two dimensional pattern of refraction that corrects one or more optical aberrations in an optical path through the lens. As used herein, a material that can be cured in such a way may be referred to as having a selectively variable index of refraction. The pattern of refraction of the layer can be produced so as to define a correction to one or more optical aberrations. It is to be appreciated that while certain embodiments of this and other methods are discussed herein with respect to a photosensitive gel layer, other embodiments can use a layer of any other material that has a selectively variable index of refraction, e.g., that can be processed or cured to vary the index of refraction.

In one embodiment, the photosensitive gel layer is formed of a polymer gel that is first formed in, for example, a large sheet. U.S. Pat. No. 7,371,804, entitled "Monomers And Polymers For Optical Elements", and incorporated by reference in its entirety, discloses embodiments of the photosensitive gel layer. A preferred embodiment is formed using a composition including a matrix polymer having a monomer mixture dispersed therein, the matrix polymer being selected from the group consisting of polyester, polystyrene, polyacrylate, thiol-cured epoxy polymer, thiol-cured isocyanate polymer, and mixtures thereof; the monomer mixture comprising a thiol monomer and at least one second monomer selected from the group consisting of ene monomer and yne monomer.

In one embodiment, a sheet of this matrix polymer, or gel, is formed. A portion of this sheet is placed between two optical elements to form a lens blank. A single large sheet can be formed in bulk with portions diced and used to form many lens blanks. The two optical elements are affixed to form a lens blank. The first and second optical elements can be plano lens or have correction power. In one embodiment, lens blanks are prepared to have a range of corrective power in the first and/or second lens, e.g., in a range separated by 0.25 diopter, or 1 diopter. In preferred embodiment, one or both of the optical elements are a thick lens that can contoured, for example, by grinding and polishing, to provide at least partial correction of one or more low order aberrations. Next at step 215, in such an embodiment, one or both outer surfaces of the optical elements may be contoured. In another embodiment, the lenses can be contoured before affixing the lenses together to form the lens blank. The lenses can be contoured using conventional grinding and polishing methods, or by freeform surfacing using a three axis turning machine such as manufactured by Schneider Optics, LOH, Gerber, Coburn, or otherwise formed to provide at least partial correction of optical aberrations. As used herein freeform surfacing refers to any method of point-to-point surfacing or machining.

Next at step 220, a pattern of refraction or refractive index, such as calculated in step 120 of method 100, is formed in the photosensitive gel layer. This pattern is configured to correct optical aberrations in a human eye. In one embodiment, the pattern of refraction formed in the photosensitive gel is calculated to correct high order aberrations and low order aberrations that are not otherwise corrected by, for example, the thin lens of a lens blank, or surfacing of the thin lens from a lens blank.

In one embodiment, this pattern of refractive index can be formed using a source of radiation, e.g., ultraviolet light, having a two dimensional grayscale pattern. A two dimensional grayscale pattern of radiation includes any pattern of radiation that varies in intensity, e.g., grayscale, in a two dimensional pattern when directed onto a surface, e.g., of an optical element. In one embodiment, radiation is directed through a photomask to control the amount of radiation received at different points in the optical element. The photomask can comprise regions that are essentially opaque to the radiation, regions that are essentially transparent to the radiation, and regions that transmit a portion of the radiation. The lens blank is exposed to the radiation for a predetermined time to cure and partially cure the photosensitive polymer such that the pattern of refractive index is formed in the lens blank. Other embodiments can use digital mask systems such as Digital Light Projector (DLP) along with a UV light source. The UV light source can include a UV Vertical Cavity Surface Emitting Laser (VSCEL), triple YAG laser, or a UV-LED.

Moving to step 230, the blank can be edged and mounted to fit a pair of frames for use by the patient. In one embodiment, the step 210 can be performed en mass to provide an inventory of lens blanks that can be conveniently processed (for example, according to steps 210 and 230) at, in some embodiments, a different location, e.g., an optometrist's office where the patient's eye is also measured.

Figure 3:
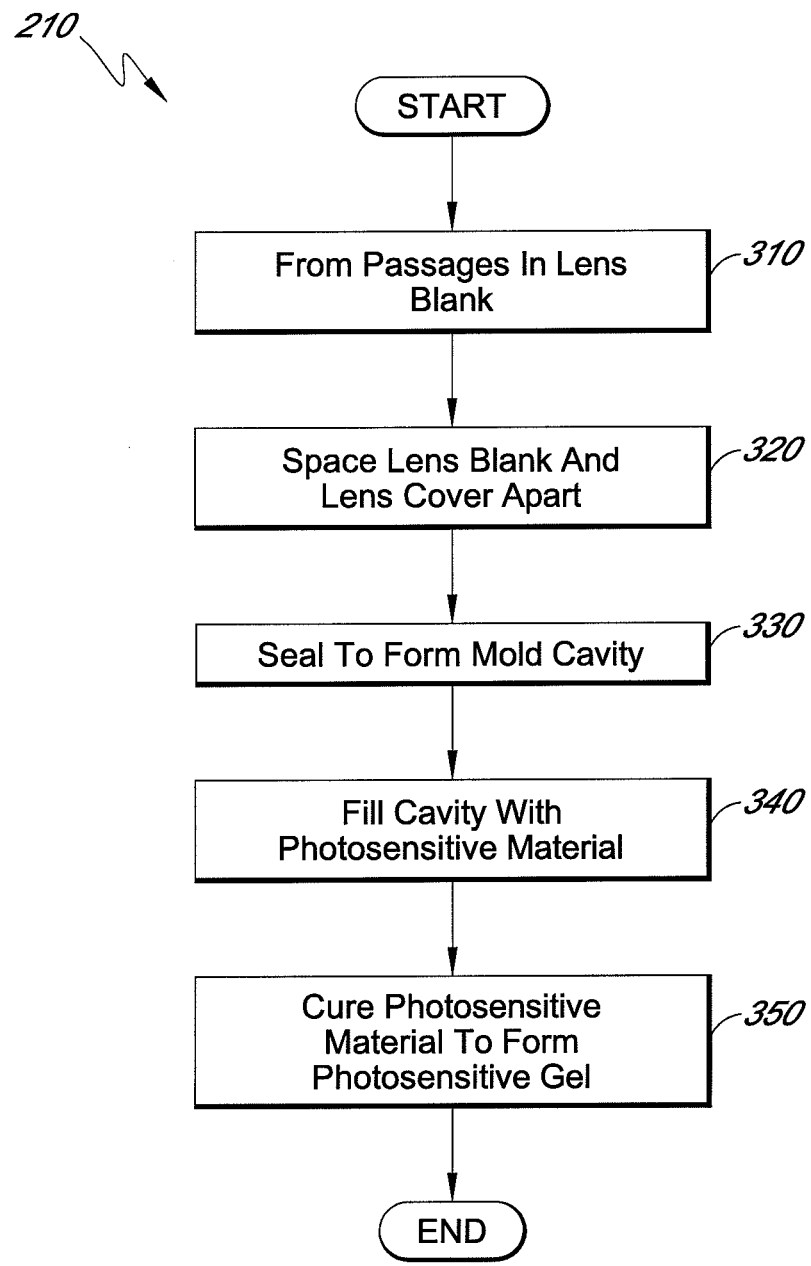
FIG. 3 is a flow chart depicting another embodiment of a method of manufacturing a lens blank as a part of a method of making a lens, such as depicted in FIG. 1.

FIG. 3 is a flow chart depicting another embodiment of a method for forming the photosensitive gel layer between a lens blank and a lens cover such as in step 210 of FIG. 2. Beginning at step 310, passages are formed in the lens blank. The lens blanks can be formed of CR-39 or other suitable materials such as polycarbonate, Finalite™ (Sola), MR-8 monomer (Mitsui), or any other material known in the art. In one embodiment, these passages can be drilled or cut into the lens blank. Generally, the lens blank is larger than the final lens that is to be fit into a spectacle frame. Thus, the area in which the passages are formed is removed from the final lens and does not inhibit the optical correction of the lens. In another embodiment, the passages are formed along with the lens blank, e.g., in a mold or press. It is to be appreciated that while two passages are discussed herein, additional passages can be formed in the lens blank to, e.g., allow faster or more even filling of the cavity between the lens blank and lens cover.

Next at step 320, the lens blank is mated with the lens cover by spacing the lens cover and lens blank at a predetermined distance determined by a spacer, or gasket. In one embodiment, the spacer is a solid material placed between the lens blank and cover. However, any method of maintaining the predetermined distance between the blank and cover can be used. Moving to step 330, a seal is formed around the perimeter of the lens blank and lens cover to form a sealed cavity therebetween. In one embodiment, an adhesive spacer with a thickness in the range of 1 to 100 mil is sandwiched between the lens blank and cover lens to form and seal the cavity. In one embodiment, the adhesive spacer is approximately 20 mil thick.

In another embodiment, mating the lens blank and lens cover to make a cavity therebetween includes a taping method. A cavity is formed by holding two lens blanks apart mechanically, e.g., by clamps or a jig, to control the thickness of the cavity. A tape or similar material is applied around the edges of the mated lens blank and cover to form a sealed cavity by wrapping the deformable elastic tape or a rubber gasket over the edges of two lens blanks and holding them together with a clamp. Further, in one embodiments, rather than forming a passage through the lens blank at step 310, the passage is formed through the spacer or tape, e.g., via inserting a syringe or other dispenser through the tape or gasket.

Continuing to step 340, a curable material formulation, in one embodiment, a photosensitive material, made, e.g., of Thiol-Ene, or a composition as described above, is mixed, degassed and transferred to a syringe in a clean environment. Using a fluid dispenser, such as a dispenser from EFD, Inc., or a mechanical-type dispenser, such as a syringe, the mixed formulation is injected through one of the passages into the cavity while the passage is for venting of the air from the cavity. In some embodiments, the material may be dispensed through a passage in the spacer or seal. In one embodiment, such a passage may be formed by the syringe used to dispense the curable material. Next at step 350, the injected lens blank is placed in an oven maintained at an elevated temperature (for example, approximately 75° C.) to cure the injected material to form the photosensitive film. In another embodiment, the curing process can be performed at room temperature, depending upon the curing properties of the injected material.

Figure 4A:
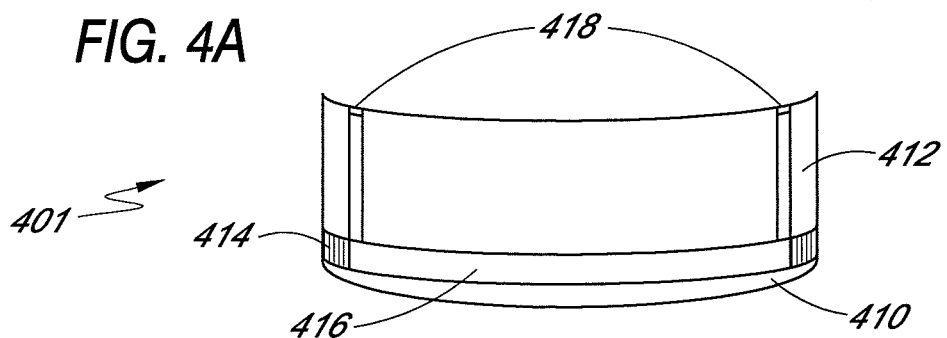
FIG. 4A illustrates a lens blank at one step of the method depicted in FIG. 3.
Figure 4B:
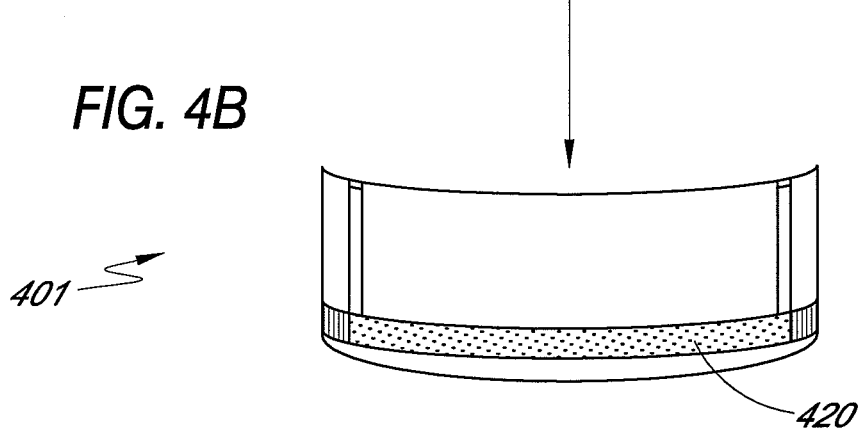
FIG. 4B illustrates the lens blank of FIG. 4A at another step of the method of FIG. 3.
Figure 4C:
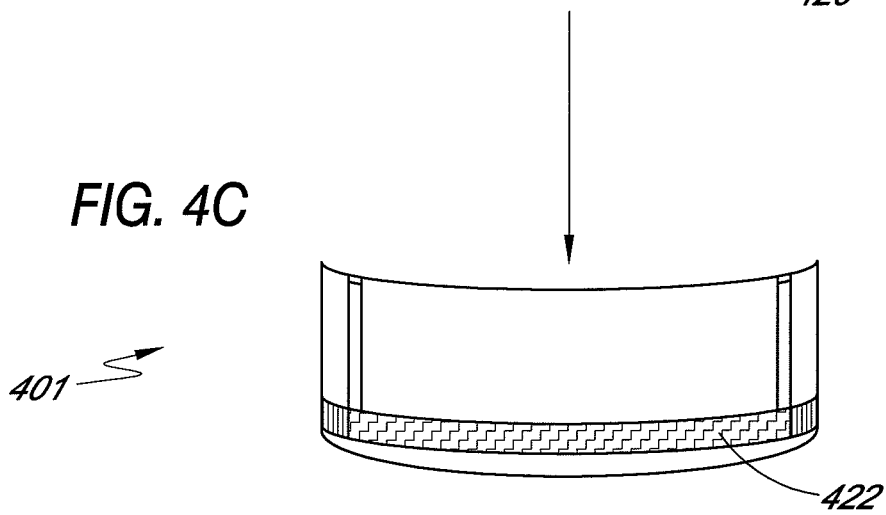
FIG. 4C illustrates the lens blank of FIG. 4A at the completion of the method of FIG. 3.

FIGS. 4A-4C depict side views of a lens 401 at various steps of manufacture using an embodiment of the method of FIG. 3. In particular, FIG. 4A depicts a lens 401 following completion of steps 310, 320, and 330 of the method of FIG. 3. A lens cover 410 is spaced from a lens blank 412 by adhesive backed spacers 414. The spacers 414 act as a gasket surrounding the edge of lens assemblies to form a cavity 416. Two or more passages 418 are formed in the lens blank 412 to allow material to be introduced into the cavity 416.

FIG. 4B depicts the lens 401 of FIG. 4A upon completion of the step 340 of FIG. 3 in which the photosensitive material has been introduced into the cavity 416 to form a layer 420. FIG. 4C depicts the lens 401 following the step 350 of the method of FIG. 3. Heat or other curing method, e.g. UV light, is applied to the layer 420 to form a photosensitive gel 422.

Figure 4D:
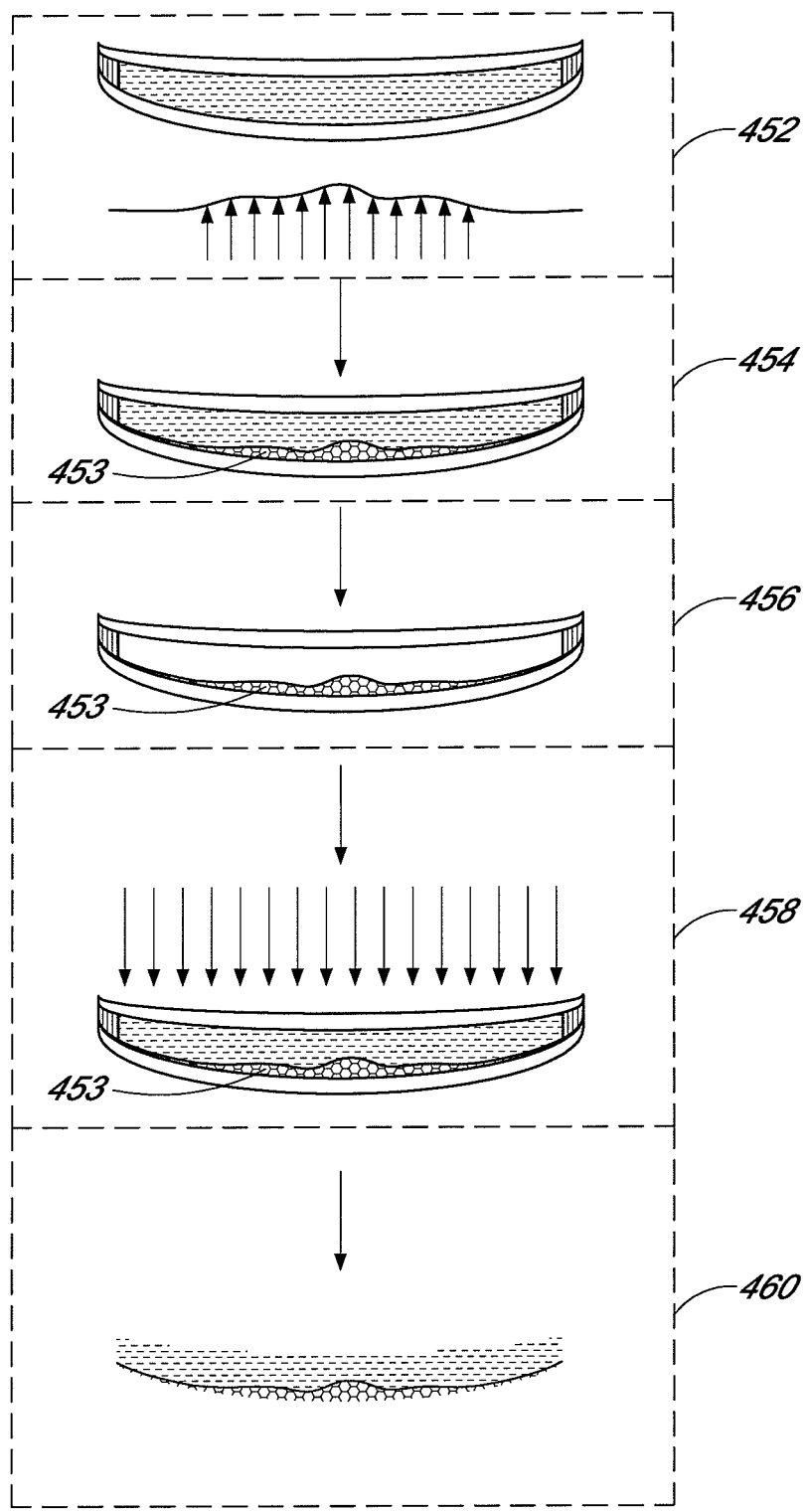
FIG. 4D graphically illustrates another embodiment of a method of manufacturing a lens, similar to the method depicted in FIG. 3.

FIG. 4D graphically illustrates another embodiment of a method of manufacturing a lens, similar to the method depicted in FIG. 3 using a cast molding approach. As described above, a low or high refractive index formulation is dispensed between two optical molds. In one embodiment, the optical molds may define a shape, e.g., a radius of curvature, that forms a selected low order prescription in the lens formed by the mold. Beginning as shown in block 452, the formulation that has been dispensed between two optical molds is selectively irradiated to create low or high order aberration corrected region 453, as shown in block 454. In one embodiment, the formulation in the mold is irradiated with a two-dimensional grayscale pattern of radiation. The two-dimensional grayscale pattern of irradiation can be generated by passing a approximately uniform light beam through a photomask, a filter such as a liquid crystal display screen, or by generating a two dimensional pattern of light such as from a two-dimensional array of light emitting diodes or a DLP with a UV light source. As shown in block 456, the formulation is then replaced with a second high or low refractive index formulation. As is next shown in block 458, the entire mold is irradiated a second time to cure the second formulation. In one embodiment, the second formulation is also irradiated with a two-dimensional grayscale pattern to cure any remaining low or high order aberrations. Moving to block 460, the lens is then removed from the molds, edged, mounted in a frame, and dispensed to the patient. In one embodiment, the irradiation shown in blocks 452 and 458 is performed at room or elevated temperatures.

Alternately, the cast molding method may involve controlled deposition of two or more formulations of low and high refractive index on one of the optical molds to correct for high order aberrations followed by correction for low order aberrations by filling a space between two optical molds, which may provide radii of curvature to correct a low order prescription, with a low or high refractive index formulation. Thermal or light induced polymerization at room or elevated temperatures allows polymerization of the formulation between the molds. The cured optical element may then be removed from the mold, edged, mounted in frames, and dispensed to the patient.

Figure 4E:
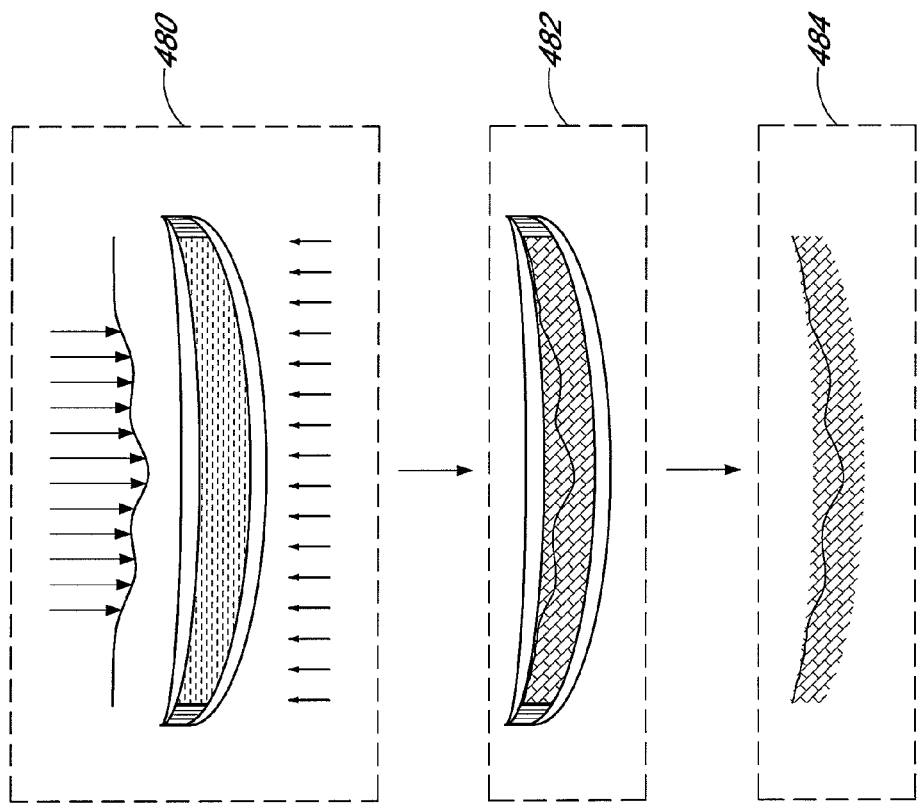
FIG. 4E is a diagram illustrating an embodiment of a method, similar to the embodiment of FIG. 4D, of creating an optical element by dispensing a mixture of low and high refractive indices formulations between these two molds.
Figure 4E:
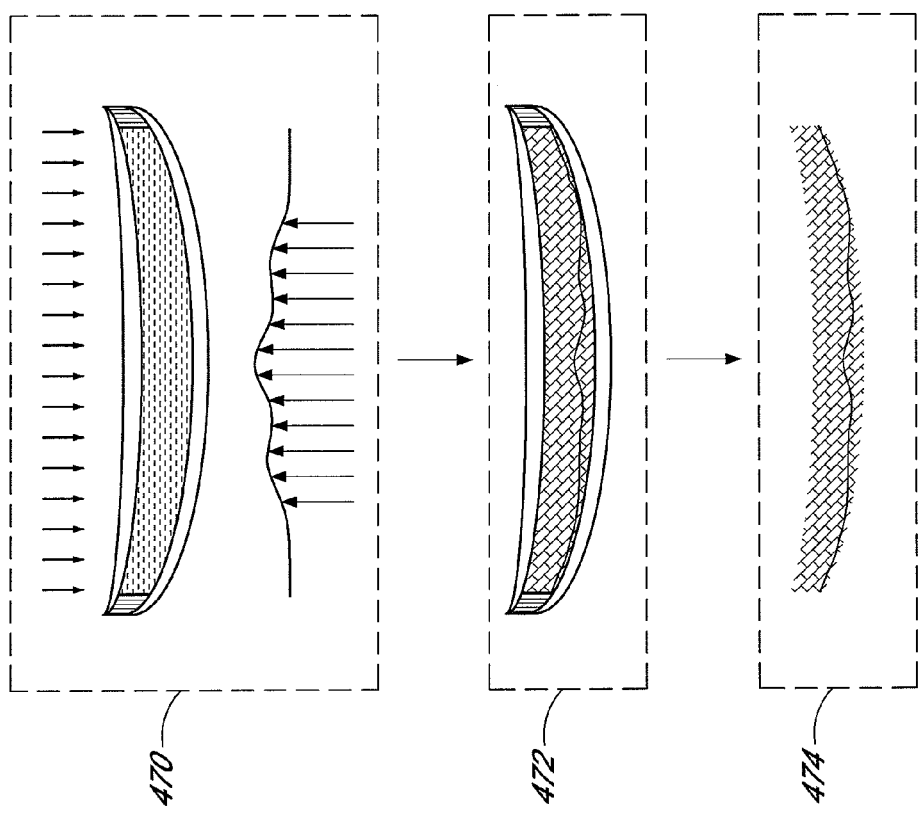

FIG. 4E is a diagram illustrating an embodiment of a method, similar to the embodiment of FIG. 4D. As shown in block 470, two formulations are dispensed between two optical molds. The formulations can include a mixture of low and high refractive indices formulations. In one embodiment, the high refractive index formulation comprises acrylate components that undergo fast photopolymerization while the low refractive index formulation comprises vinyl or allyl components that undergo relatively slower photopolymerization as compared to the acrylate components. Alternately, the low refractive index formulation may comprise fast reacting acrylate components and the high refractive index formulation may comprise slow reacting vinyl or allyl components.

As shown in block 470, the formulation in the optical molds can be exposed on one side to spatially modulated high intensity light radiation to define a cured volume having a refractive index that corrects high order aberrations, while the other side of the mold may be concurrently exposed to spatially modulated low intensity light for correcting low order aberrations. The low and high intensity modulated light crosslinks the fast and slow reacting formulations at different speeds where the fast curing formulation is selectively cured to a greater extent as compared to the slow curing formulation which barely undergoes any curing. If there is a need to control the extent of photopolymerization of one formulation over the other, step-growth photopolymerization of thiol and ene components (low or high refractive index) may be incorporated. One embodiment uses the method of frontal-polymerization, where the polymerization front is easily monitored, to control the depth of photopolymerization of one of the two formulations. Also, based on the amount of photoinitiator, photoinitiator-additive (UV-absorber or inhibitor) present in the formulation, the depth of curing can be controlled. The curing front can be controlled to create a contour surface corresponding to the correction of low or high order aberration needed in this formulation. Block 472 illustrates the resulting cured contoured volume in the lens. The uncured material can be removed from the mold and replaced with a second layer of curable material. This second material can be further cured to produce the lens, which can then be removed from the mold as illustrated in block 474.

In order to overcome any physical phase separation between the two cured formulations, one of the components in the formulation may be selected to be the same. Additionally, the lenses can be engraved with fiduciary marks to locate the segmental height, addition zones, etc. As shown in block 474, the fully corrected lenses can be removed from the optical mold and after the edging process, these lenses can be mounted in the frame and dispensed right at the optics lab. The above-described process of cast molding advantageously corrects aberration zones in the customized lens with precision and accuracy as they are controlled during the cast molding process. Additionally, the contour surface corresponding to the low and the high order aberration corrections may be precisely controlled in the lens. The low and high intensity modulated light can be directed into the lens from either side. Blocks 480, 482, and 484 illustrate another embodiment of the method shown in blocks 470, 472, 474. In embodiment shown in block 480, the orientation of the low and high intensity radiation is reversed with respect to the embodiment illustrated in block 470.

Figure 5:
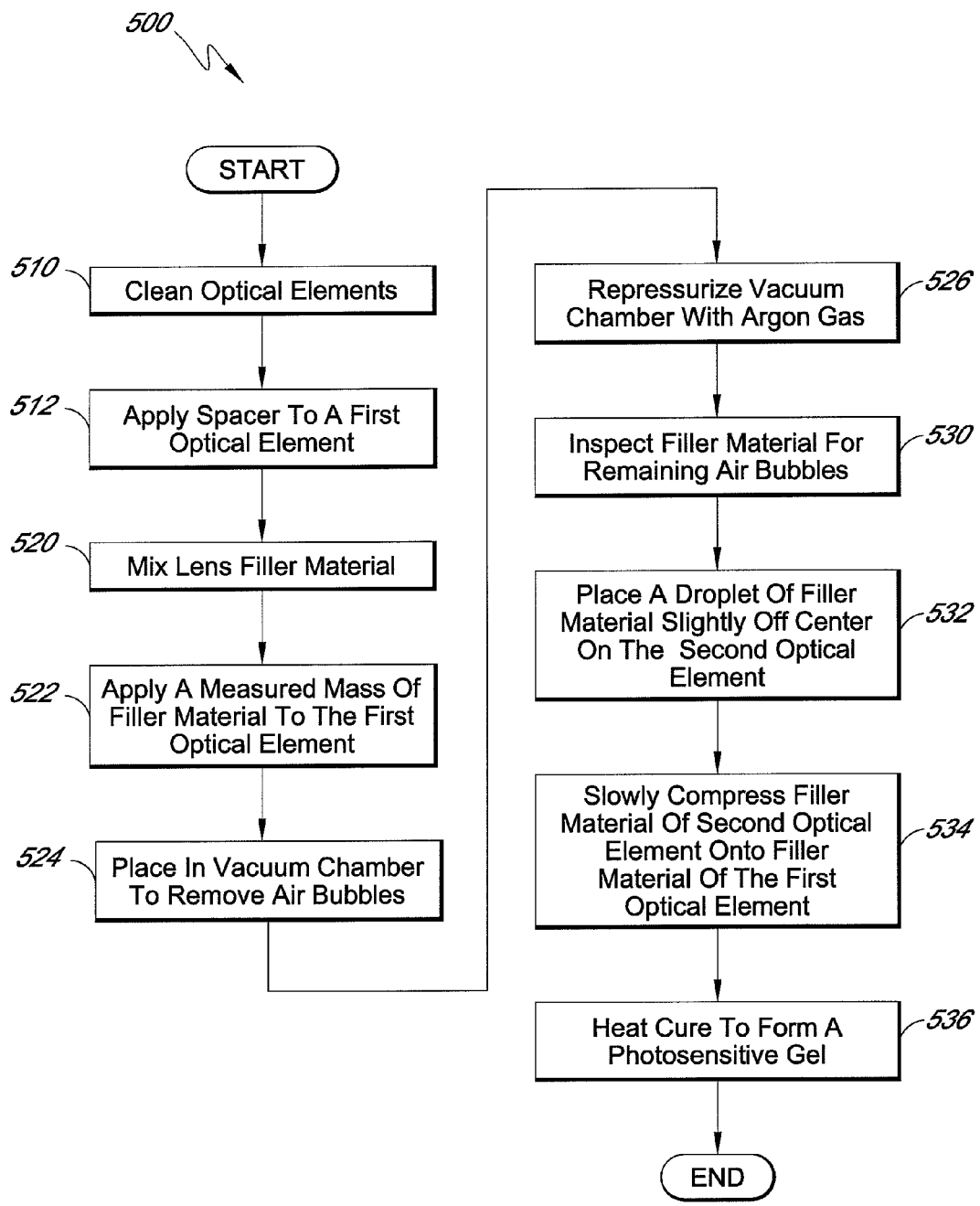
FIG. 5 is a flow chart depicting another embodiment of a method of making an optical lens as part of the process of FIG. 1.

FIG. 5 depicts one embodiment of a method 500 of performing the step 210 of FIG. 2. Beginning at step 510, spacer materials are prepared for placement between a thick and thin lens blank. Beginning at step 510, a pair of optical elements, e.g., lens blanks are cleaned. Each of the lens blanks can be formed of a material such as CR-39, polycarbonate, Finalite™ (Sola), MR-8 monomer (Mitsui), 1.67, 1.71, 1.74 materials, or any other suitable material as would be apparent to one of skill in the art. In one embodiment, the optical elements include a thick and thin lens blank. In other embodiments, two thick or two thin lens blanks may be used, depending upon the corrective power of the lens to be produced. Because any contaminants formed into an optical lens can cause aberrations, the materials used in the process should be kept very clean. A gas such as argon, nitrogen, or air, preferably filtered, can be blown over the optical elements to remove contaminants. Next at step 512, spacer materials are applied to the thin lens. In one embodiment, the spacer materials include 2 layers of 10 mil ceramic tape for a 20 mil gap, which are cut into small rectangles. Others embodiment can use other thicknesses of tape or other types of gasket, including adhesive gasket materials.

Moving to step 520, the lens filler material is mixed. The material can include any suitable photosensitive material described herein. Continuing at step 522, an amount of the filler material having a predetermined mass is measured and applied to the thin lens.

In addition to other contaminants, air bubbles in the filler material can also cause optical aberrations in the final lens. Thus, next at step 524, the thin lens is placed in a vacuum chamber to remove air bubbles from the filler material. Moving to step 526, the vacuum chamber is depressurized using, e.g., argon gas. Moving to step 530, the filler material is inspected for any remaining air bubbles. In one embodiment, these can be removed by carefully tooling the material by hand to move the pocket to the surface where it can be collapsed.

Placing the thick lens blank over the thin lens blank can tend to introduce air pockets into the final lens. However, it has been found that by placing a droplet of the filler material onto the thick lens, this tendency is substantially reduced. Thus, moving to step 532, a droplet of the filler material is placed slightly off center on the thick lens. Next at step 534, the filler material on the thick lens is slowly compressed onto the main mass of filler material on the thin lens until the final lens is formed. Continuing to step 536, the lens is cured, e.g. using heat, to form the filler material into a photosensitive gel. The method 500 then ends, having formed a lens blank with a photosensitive gel layer such as is used in the method of FIG. 2.

Figure 6:
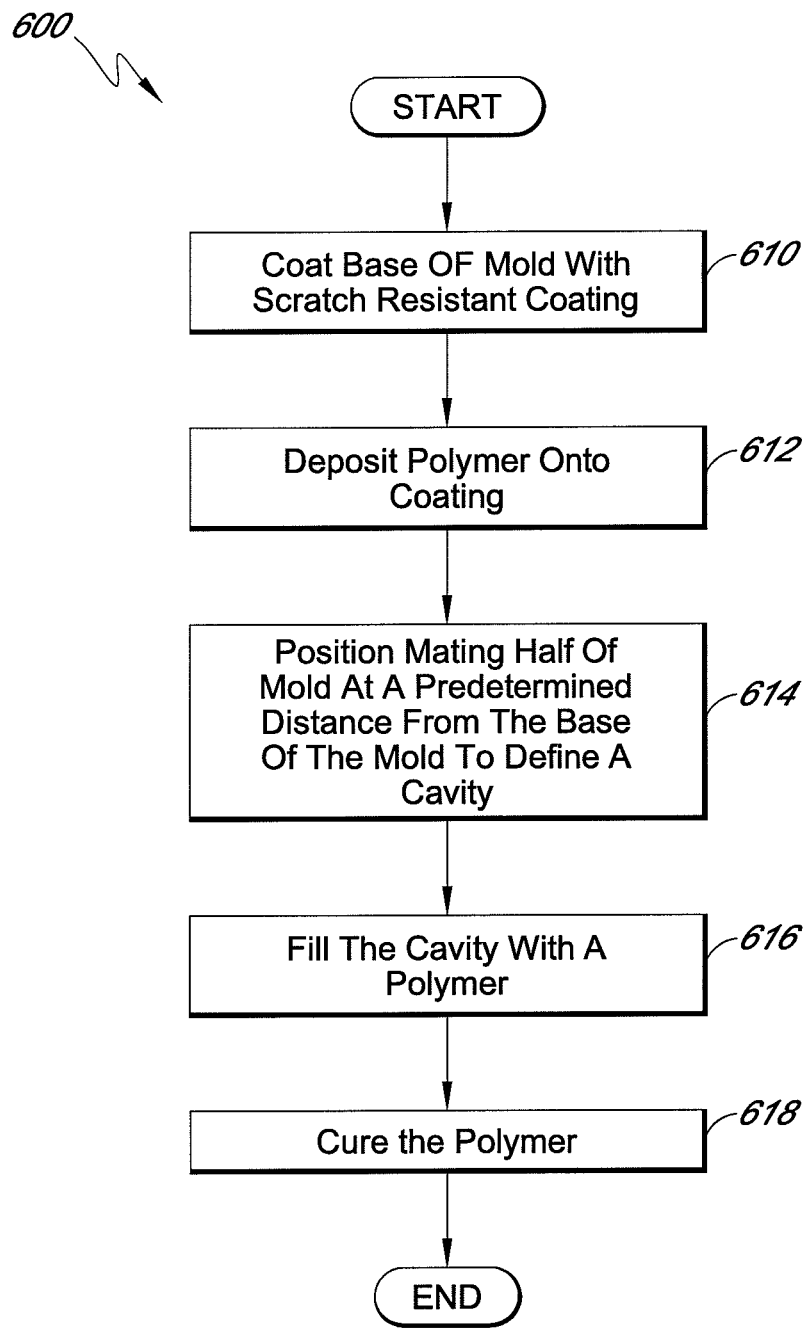
FIG. 6 is a flow chart depicting an embodiment of a method of making a lens for correcting optical aberration similar to the method depicted in FIG. 1, but using a mold.

FIG. 6 depicts one embodiment of a method 600 of forming a lens configured to have a pattern of refractive index calculated to correct high and low order optical aberrations. Beginning at a step 610, a base surface of a mold is coated with a scratch resistant coating. Next at step 612, a layer of polymer is deposited on the mold surface to define a predetermined index of refraction. Other embodiments of programming the lens are described below with respect to FIGS. 7A-7E and FIGS. 7F-J.

Continuing to step 614, a mating member of the mold is positioned at a predetermined distance from the base of the mold to define a cavity. The shape of this cavity can be calculated to correct one or more low order aberrations. Next at step 616, the cavity is filled with a suitable polymer or polymerizable material, such as CR-39, polycarbonate, Finalite™ (Sola), MR-8 monomer (Mitsui), 1.67, 1.71, 1.74 materials, or any other suitable material known in the art, which forms a substantially rigid lens body. Moving to step 618, the polymer material is cured. The lens can then be removed from the mold and fitted to spectacle frames.

FIGS. 7A to 7E depicts a simplified diagram of a mold during various acts of one embodiment of the method 600. FIG. 7A depicts a mold base 710 being centered with a known center line along line 702. Note that the layers depicted in FIGS. 7A to 7E are not necessarily to scale.

FIG. 7B depicts one embodiment of step 612 of the method 600. A head 712 deposits a spray 714 of droplets to form a polymer layer 716. The thickness of the polymer layer 716 at a location on the layer determines the refractive index of the layer at that location. The head 712 deposits the layer to have a thickness that is varied so as to define a predetermined pattern of refraction. Stated differently, the surface profile or peak to valley height difference of the deposited polymer corresponds to the desired aberration correction.

FIG. 7C depicts a mating member 720 placed over the base 710 to form a cavity as described with respect to step 614 of the method 600. A second layer of material can be formed within a mold to maintain an optical quality and uniformity of the surface. FIG. 7D depicts the mold after having been filled with the polymer, as described with respect to the step 616 of the method 600. FIG. 7E depicts a completed optical lens 724 after having been removed from the mold. This optical lens can be fitted to a pair of spectacle frames.

FIGS. 7F-7J illustrate steps of a method making a lens similar to the method depicted in FIGS. 7A to 7E, except that the layer has a generally uniform thickness and is composed of varying proportions of materials to vary the index of refraction across the surface of the lens. In another embodiment, programming of lenses, e.g., defining the pattern of refraction, is performed by controlled deposition of two or more compatible formulations of varied refractive indices onto lenses 710 that have already been corrected for lower order aberrations. The formulations are photopolymerized during or after depositions to fix the corrected low order and high order aberrations. An exemplary process of programming of lenses by deposition includes the following steps:

(a) as depicted in FIG. 7G, positioning a first spray head and a second spray head 716 at an operative distance from a substrate 710;

(b) projecting a first droplet from the first spray head onto a pre-selected location on the substrate to form a first deposited droplet, the first droplet comprising a first amount of a first polymer composition;

(c) projecting a second droplet from the second spray head onto the substrate in close proximity to the first deposited droplet, the second droplet comprising a second amount of a second polymer composition;

(d) forming a first polymer pixel on the substrate, the first polymer pixel comprising the first polymer composition and the second polymer composition in a first ratio;

(e) adjusting at least one of the first and second spray heads to allow an additional droplet to be projected, the additional droplet being different from at least one of the first and second droplets;

(f) adjusting the positioning of the first and second spray heads with respect to the substrate; and (g) repeating steps (a)-(f) to thereby form a second polymer pixel adjoining the first polymer pixel, the second polymer pixel comprising the first polymer composition and the second polymer composition in a second ratio so as to form the layer. The pixels together form the layer 716 of FIG. 7G. This process is further described in U.S. patent application Ser. No. 10/253,956 by Lai, et al., filed on Sep. 24, 2002, and titled "Optical Elements And Method Of Making Them", which is hereby incorporated by reference in its entirety. As with the method described with respect to FIGS. 7A-7E, a second layer of material can be formed within a mold to maintain an optical quality and uniformity of the surface.

Figure 8:
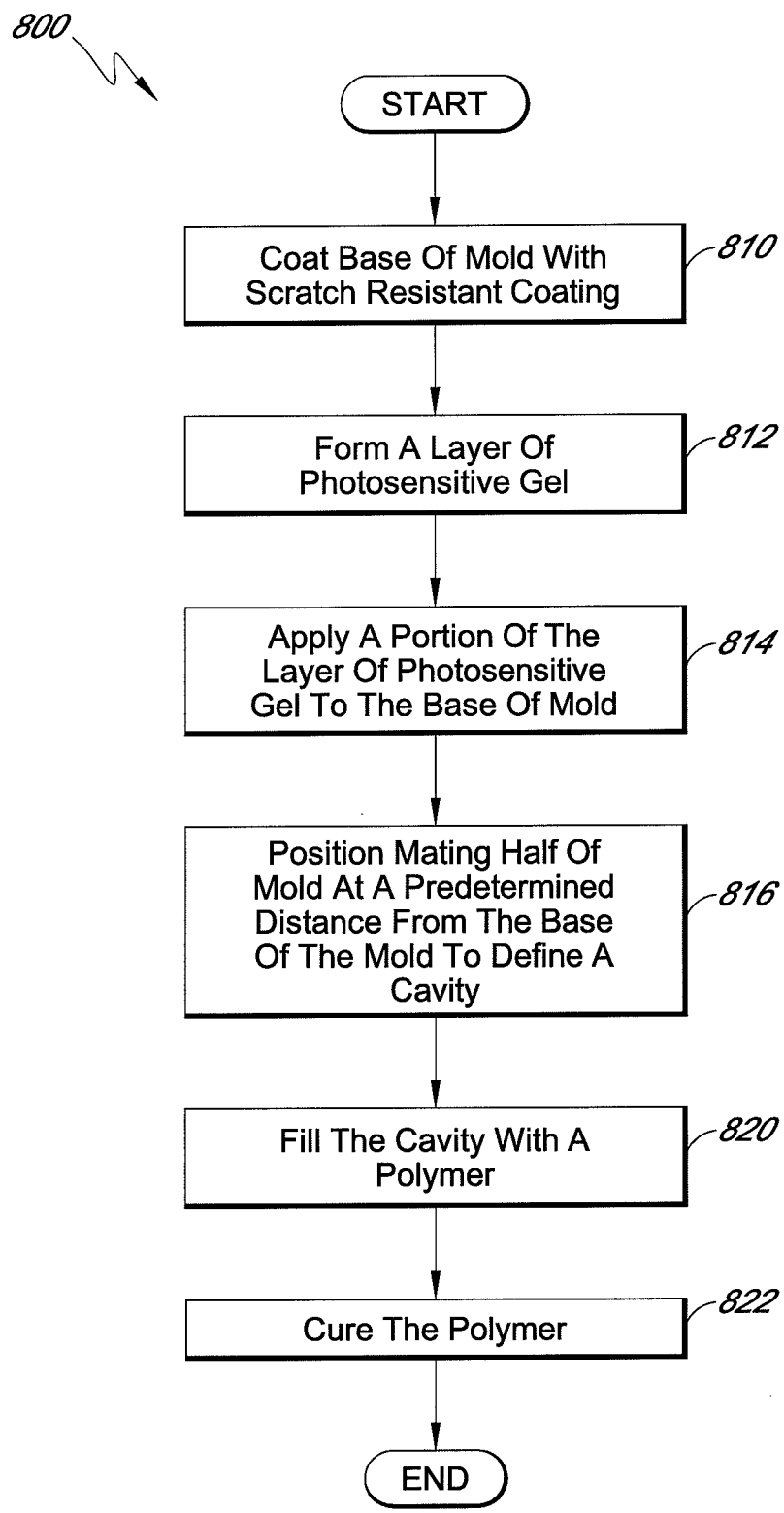
FIG. 8 is a flow chart depicting an embodiment of a method of making a lens blank using a free standing filmy gel of polymer material similar to the method depicted in FIG. 6.

FIG. 8 is a flow chart depicting one embodiment of a method 800 of producing an optical lens blank using a mold process similar to that of the method 600 discussed with respect to FIG. 6. Beginning at step 810, a scratch resistant coating is applied to the mold base 710. Next at step 812, a layer of photosensitive gel is formed. In one embodiment, a sheet of photosensitive polymer gel, as described with respect to step 210, above, can be formed in bulk to provide a gel layer for many lenses. Moving to step 814, a portion of the sheet is placed over the mold base 710.

Continuing at step 816, the mating member 720 of the mold is placed over the mold base 710 to form a cavity between the mating member 720 and the polymer gel layer (not shown in FIG. 7C, but comprising a layer similarly placed to the layer 716). Next at step 820, the cavity is filled with volume 722 of a polymer, such as CR-39, that forms the supporting body of the lens. Next at step 822, the polymer volume 722 is cured to produce an optical lens blank. The lens blank can have a predetermined pattern of refraction formed in the gel layer by, for example, the masking method described above. The gel layer can also be further bulk cured to increase the rigidity of the layer to prevent damage from physical contact. The cured gel may be coated with a scratch resistant or hard coating to enhance its mechanical strength.

In another similar embodiment, the portion of the sheet can be vacuum formed with a stock optical element to form a lens. The stock optical element can be a formed of a polymer such as CR-39 or a similar material, such as those known in the art. The stock optical element may be plano or provide a correction of one or more low order optical aberrations. In one embodiment, the portion of sheet of semi-cured material is applied to the stock optical element with a small amount of monomer, such as used in to form the sheet, between the stock optical element and the portion of the sheet. The lamination of the portion of the sheet and the optical element can be placed into a flexible mold. Vacuum pressure is applied to pull the stock optical element into the portion of the sheet and against the flexible mold. The monomer can be cured through application of light or heat while the vacuum is applied. In another embodiment, monomer material is introduced between the stock optical element and the mold. The vacuum is applied to force the monomer into a thin layer over the surface of the stock optical element between the element and the flexible mold. The monomer is at least partially cured to form the semi-cured layer of material. The resulting lens blank may be edged and applied or mounted to a frame. The lens blank can be further cured to define a pattern of refraction in the material that corrects one or more high order optical aberrations. More details of one such process are disclosed in U.S. Pat. No. 6,319,433, which is incorporated by reference in its entirety.

In another embodiment, a mounted or framed lens may be used in place of the stock optical element. A layer of semi-cured material is thus formed on a previously prepared, or framed, lens. This layer can be further selectively cured to define a pattern of refraction that corrects one or more high order aberrations. In addition, one or more low order aberrations may also be corrected in the lens. For example, small low order corrections that are not corrected by stock lens, e.g., less than 0.25 diopters, may be corrected in the layer. In addition, high order corrections may be added to existing framed lens as provided by a patient. For example, an existing or previously obtained optical lens may be modified to correct any remaining low or high order aberrations that are not corrected by the unmodified lens.

Figure 9:
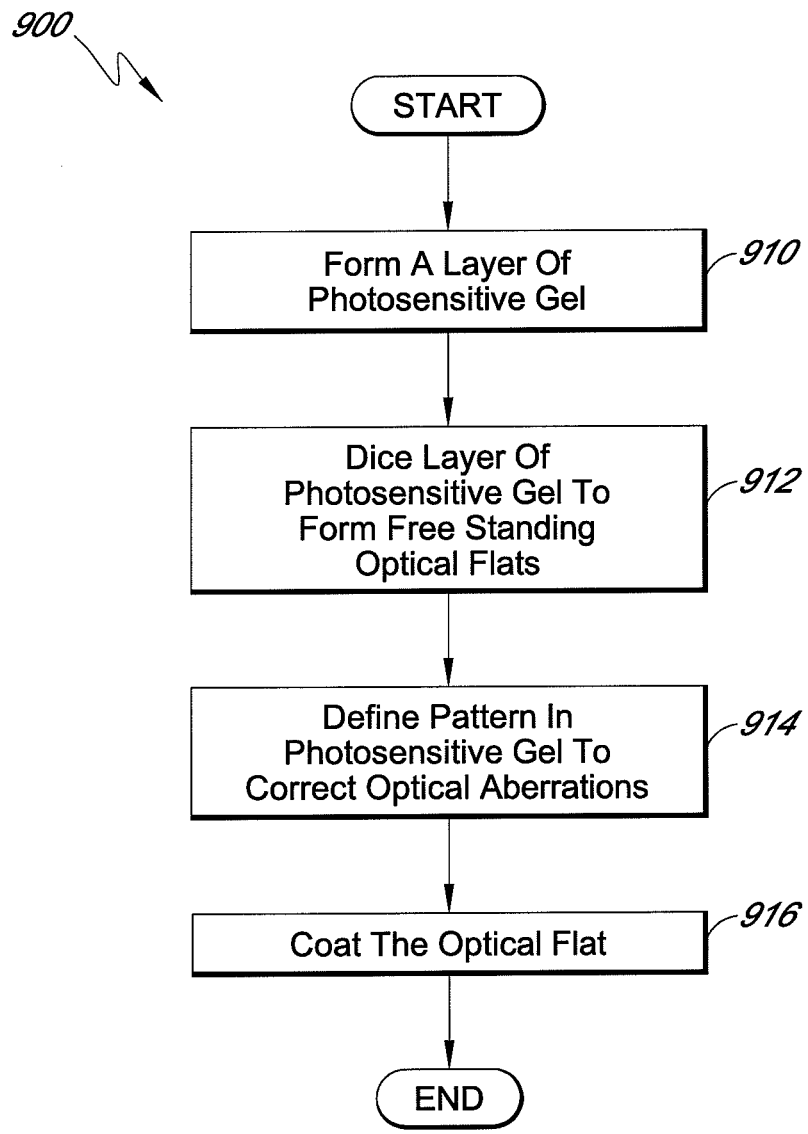
FIG. 9 is a flow chart depicting an embodiment of a method of making a lens blank using a free standing filmy gel of polymer material into a lens blank for use in, e.g., an embodiment of the method of FIG. 1.

FIG. 9 is a flow chart of an embodiment of another method 900 of manufacturing a lens blank. Beginning at step 910, a sheet, or layer of a photosensitive gel is formed, as is discussed above. Next at step 912, the sheet is diced to form a group of freestanding optical flats.

Moving to step 914, a pattern of refraction calculated to correct optical aberrations can be formed within the gel by photo-curing, for example, using the masking method discussed herein. In one embodiment, the optical flat can be stamped or otherwise formed into a curved lens shape or shaped to correct at least some low order optical aberrations. Moreover, the gel can be further bulk cured to increase its rigidity.

Next at step 916, the method 900 completes by applying one or more coatings to the optical flat. These coatings can include coatings of scratch resistant material. In other embodiments, these coatings can include materials to provide additional rigidity to the lens. The completed lens blank can be used as described herein to form a complete optical lens for correcting low and/or high order optical aberrations.

Each of the methods described above can advantageously be performed at a single or multiple location. More particularly, the process of refracting the patient, grinding the semi-finished lens blanks, correcting the low and/or high order aberrations, and fitting the frames holding the lenses to the patient's line of sight can be performed at one or multiple location. Thus, a vision prescription can be administered and customized lenses dispensed to the patient in a single visit to an optometrist. Additionally, the purchase of the lens and/or payment for the examination can be completed at the same location, and during the same visit, by allowing the patient to pay with a cash, other legal tender, or credit transaction.

In yet another embodiment, the patient's low order and/or high order aberration measured by the aberrometer can be corrected in plano lenses pre-mounted in frames. In one embodiment, the plano lenses can be flat, or can have a curve for cosmetic reasons, e.g. to have an appearance mimicking a standard lens. The plano lenses can be made either of a refractive index changing material or of a carrier material suitable for controlled deposition. The entire method 100 of measuring the patient's refraction, selection of framed plano lenses, corrections of low and/or high order aberrations, dispensing customized lenses can all be performed at one location. The correction of low and/or high order aberration can involve any of the programming methods described above, such as selective refractive index changes that corresponds to the desired corrections, controlled deposition of low and high refractive index formulation that corresponds to the desired corrections, or selective volume change of a layer which varies the height, and thickness of the layer to correspond to the desired corrections. Additionally, cash, other legal tender such as electronic transfers or credit transactions can be included in the processes involves in making customized lenses.

Figure 10:
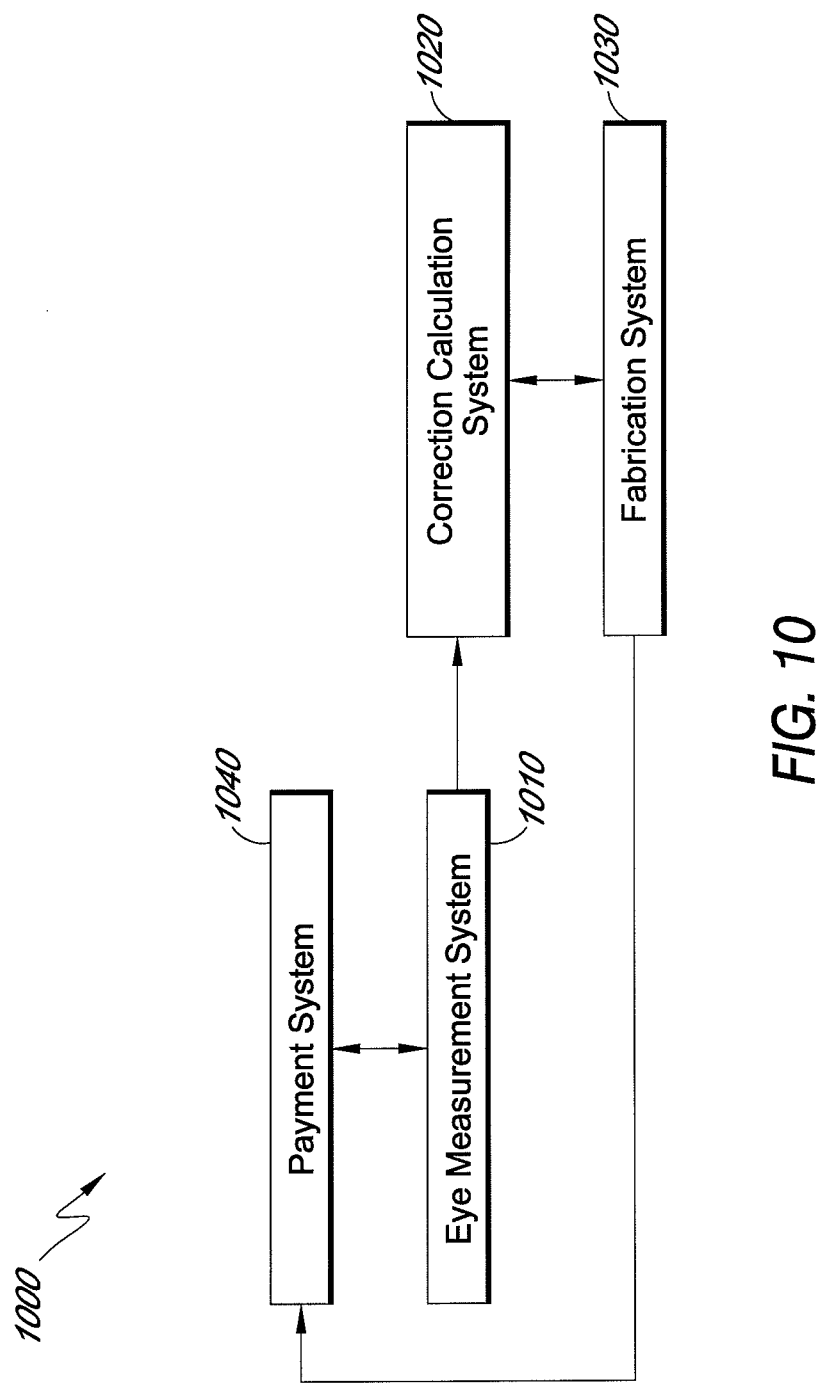
FIG. 10 is a simplified block diagram depicting one embodiment of a system for producing spectacle lens, e.g., using one embodiment of the method of FIG. 1.

FIG. 10 is a block diagram illustrating components of an exemplary system 1000 for measuring eyes, calculating correction data, and fabricating lenses that correct for the measured disorders. Each of these functions can be performed by a component system, e.g., an eye measurement system 1010, a correction calculation system 1020, a fabrication system 1030, and a billing and payment system 1040. Various embodiments of the system 1000 can include various embodiments of these component systems. In some embodiments, some of the component systems 1010, 1020, 1030, and 1040 of the system 1000 can be combined to form an integrated system. For example, in one embodiment, the measurement system 1010 can be integrated with the correction calculation system 1020. In another embodiment, the measurement system 1010 can be integrated with the fabrication system 1030. In one embodiment, each of the components can be co-located. In other embodiments, the system components 1010, 1020, 1030, and 1040 can be at separate locations. The measurement system 1010 may desirably be located at the office of an optometrist or other consumer accessible office or storefront. The fabrication system 1030 may desirably be located at an optical lab. In one embodiment, the calculating system 1020 is integrated with the measurement system 1010. In another embodiment, discussed below in further detail, the calculation system 1020 is located at a central location separated by a computer network or other data communications system to serve one or more measurement systems 1010.

An embodiment of the eye measurement system 1010, can include any one of the various wavefront sensors described above to measure vision parameters, such as disorders, or aberrations, of a patient's eye(s). The eye measurement system 1010 can also include a phoropter, autorefractor, or trial lens. Embodiments of the eye measurement system 1010 can produce eye measurement data that represents optical low and/or high order aberrations.

The correction calculation system 1020 receives the eye measurement data and determines a lens definition that is used in fabricating lenses. Embodiments of the correction calculation system 1020 can include computer hardware, software, firmware, or a combination thereof.

In one embodiment, the correction calculation system 1020 generates a wavemap, indicating corrections to compensate for the high and/or low order aberrations of a patient's eyes. The lens definition can include the wavemap, a pattern of refraction, a prescription in terms of sphere, cylinder, and axis, or any other relation to a pattern of refraction or correction. In addition, the lens definition may include an optical center, multiple optical centers, single correction zones, multiple correction zones, transition zone, blend zone, swim region, channel, add zones, vertex distance, segmental height, off-axis gaze zone, logos, invisible markings, etc.

In one embodiment, the lens definition includes one or more numbers or symbols that identify a pattern of refraction or correction. Such identifiers may act as easily transmitted "prescriptions" that can be transmitted electronically, or physically, e.g. via a barcode.

In one embodiment, the correction calculation system 1020 converts the wavefront map into another format indicative of a lens that is optimized for the patient. The wavefront map, or other data indicative of a lens optimized for the patient, can be partly based on characteristics, such as the patient's vertex distance, pupil size, pupil distance, frame information, gaze, segmental height, pantascopic tilt, or x-y tilt, for example.

To calculate the lens definition, the correction calculation system 1020 can generate a conjugate of the optical aberrations of the patient's eyes. In other embodiments, the calculation of the lens definition can be made with reference to additional metrics for calculating the lens definition based on measurements of the patient's eye, including measured optical aberrations. For example, U.S. Pat. No. 6,511,180, issued on Jan. 28, 2003, and incorporated by reference in its entirety, discloses an image quality metric for determining the correction based on the measured optical aberrations. Other embodiments may use other metrics to calculate the lens definition. The metric may optimize the lens definition by selecting for correction those optical aberrations that are associated with improved subjective measures of a patient's vision. In another embodiment, the metric may include a software neural network that has been trained using data from test subjects to select which optical aberrations are desirable to correct, add, or leave uncorrected. More details of such an embodiment are described in U.S. Provisional Patent Application No. 60/546,378, filed on Feb. 20, 2004, incorporated by reference in its entirety.

In one embodiment, the correction calculation system 1020 can also calculate the wavefront map based on a color preference. High order corrections may vary based on the color of the light passing through the corrective element. The color preference generally refers to a wavelength for which the patient prefers to optimize high order correction. For example, this allows the user to optimize the correction at wavelengths that are most useful for a specific activity, e.g., green for golfing. In one embodiment, the color preference depends on the aberrometer measurement at 850 nm and converting to 550 nm (green), or 400 to 800 nm conversion for other color enhancements.

In one embodiment, the correction calculation system 1020 can also calculate the lens definition with reference to one or more other patient preferences. The patient preferences can include a spectral tint, or color, in the lens. The patient preferences can also include whether to include a photochromic, light sensitive color change, feature to the lens definition. In addition, the correction calculation system 1020 can also calculate the lens definition with respect to other features such as a ultra-violet coating preference, anti-reflective coating preference. In one embodiment, the lens definition can also be calculated with respect to patient wear preference such as how the patient prefers wear the a high order correction zone in relation to the patient's frames and view.

The correction calculation system can calculate the lens definition to include one or more correction zones. The calculation can include calculation of the number and size of the correction zones. Each of the correction zones can correct for high order aberrations, low order aberrations, both high and low order aberrations, and front and back radius of curvature. The correction zones can include an optical center zone or multiple optical centers, e.g., progressive or multi-focal lens. One embodiment of the correction calculation system 1020 can calculate a blending or transition zone between one or more of the correction zones and other portions of the lens. The transition zone allows the eye's gaze to smoothly transition from the correction zone, which is generally only a portion of the lens, and other portions of the lens. Transition zones can also include transitions between correction zones. Transition zones are discussed in more detail in U.S. Pat. No. 6,712,466, entitled "EYEGLASS MANUFACTURING METHOD USING VARIABLE INDEX LAYER," issued on Mar. 30, 2004, and herein incorporated by reference in its entirety.

In one embodiment, the correction calculation system 1020 includes a server computer that executes software to perform the functions of the correction calculation system 1020. The server can communicate with other components of the system 1000 via a network. The network can be a local or wide area network using any data communications technology, such as would be apparent to one of skill in the art. In one embodiment, the network includes the Internet. In one embodiment, the correction calculation system 1020 is co-located with other components of the system 1000. In other embodiments, the correction calculation system 1020 can be connected to the other components of the system 1000 by the network but located in a different location from the other components of the system 1000. In one exemplary embodiment, the correction calculation system 1020 is configured to support one or more systems 1000. In such an embodiment, the correction calculation system 1020 can include a billing module. The billing module can charge based on usage of the correction calculation system 1020, e.g., each time that a lens definition is calculated or downloaded.

The fabrication system 1030 uses the correction data from the correction calculation system 1020 and fabricates customized lenses for the patient. The fabrication system 1030 can include a programmer that transfers the lens definition to a lens. The programmer can include a radiation source and photomask as described herein. The programmer can also include a deposition device configured to perform controlled deposition of one or more materials.

In one embodiment, the fabrication system 1030 corrects for low order and high order aberrations concurrently. For example, a lens blank is programmed, e.g., using the radiation source and photomask to cure photosensitive material to vary its index of refraction, to correct both low and high order aberrations.

In another embodiment, the fabrication system 1030 corrects for substantially all of low order aberrations and then for high order aberrations. In such an embodiment, a blank is selected in which all, or substantially all of the low order aberrations have been corrected in forming or grinding a shape to the lens blank. The high order aberrations, and in one embodiment, any remaining low order aberrations, are corrected using, e.g., a programmer. A programmer refers to any device for performing one or more of the methods disclosed herein of defining a pattern of refraction in an optical element.

In another embodiment, the fabrication system 1030 corrects for high order aberrations and then for low order aberrations. For example, an embodiment of the method 600 can be used to deposit a layer having a predetermined index of refraction to correct high order aberrations after which a mold is used to form a complete lens having a molded shape that is calculated to correct low order aberrations.

In another embodiment, the fabrication system 1030 corrects for high order aberrations and then for low order aberrations. For example, as described herein, an embodiment of the method 600 can be used to deposit a layer having a predetermined variation in thickness to correct high order aberrations after which a mold is used to form a complete lens having a molded shape that is calculated to correct low order aberrations.

The fabrication system tracks the correction of the low order aberrations, programming of at least one high or residual low or high order aberrations. Fabrication system tracks the right and left lens and the correction required in each of these lenses. Fabrication system tracks the lens number, low order ground, polishing, programming, edging, coatings, frames, etc.

A payment system 1040 includes hardware and/or software that allow patients to pay for lenses, examination fees, and/or other fees with cash, credit, or any other form of payment. Embodiments of the payment system 1040 can be computer hardware, software, firmware, or a combination thereof. Such embodiments can include cash registers, smart card readers, or charge or credit card readers.

In one embodiment, the eye measurement system 1010 and each of the component systems 1020, 1030, and 1040 are located at a single location. A single location refers to a location such as an office, a storefront, or an optical laboratory. Accordingly, a patient can obtain a prescription and have customized lenses fabricated at a single location and in a single visit to the location. In another embodiment, the component systems 1010, 1020, and 1030 can be located at one, two, three, or more locations. Each component of the system 1000 can communicate using any medium and protocol know in the art. For example, in one embodiment the components of the system 100 can communicate by using a network, such as an intranet or the Internet. In other embodiments, the components can provide, e.g., print, data in a tangible form. For example, the correction calculation system 1020 can print a bar code that describes a lens or identifies a lens definition. In other embodiments, the components can send and receive data via removable computer disk, smart cards, or other physical electronic media. Such printed and electronic media can be exchanged by physical delivery or facsimile transmission. Placing each element at separate locations allows each system to be of optimal size and for expensive equipment, e.g., the calculation system or fabrication system, to be shared between measurement system locations, e.g., sales locations such as storefronts.

Figure 11:
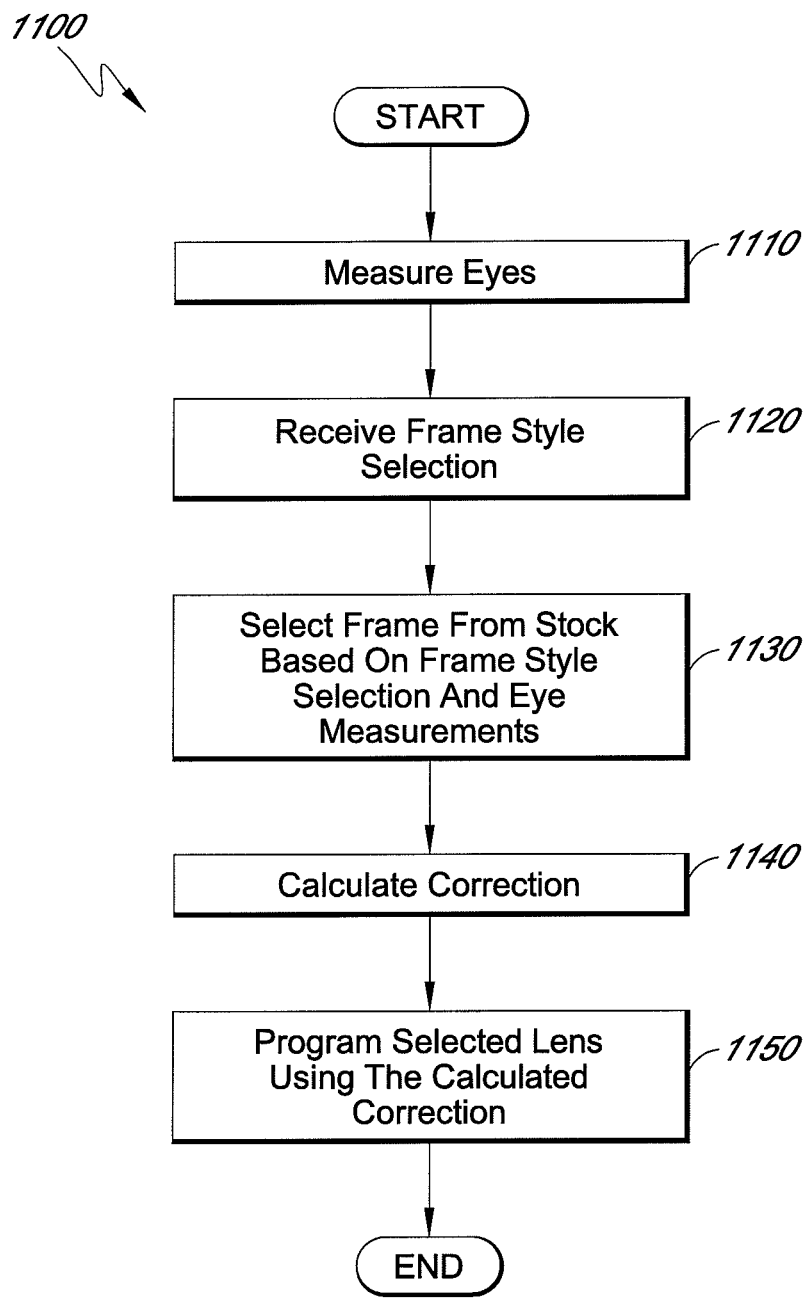
FIG. 11 is one embodiment of a method of producing spectacles using an embodiment of a system such as depicted in FIG. 10.

FIG. 11 is one embodiment of a method 1100 of producing spectacles using an embodiment of the system 1000 such as depicted in FIG. 10. The method 1100 begins at step 1110 where the patient's eyes are measured, for example, by the measurement system 1010. Next at step 1120, a patient selects a frame style. This frame style selection is received, e.g., by the correction calculation system 1020 and the fabrication system 1030. Moving to step 1130, a spectacle frame, including lenses is selected from a stock of available frames based on the eye measurements and the frame style selection. The lenses of the frame stock include a programmable element, e.g., a layer of polymer having an index of refraction that can be selectively varied by further, e.g., pointwise, curing. The lens can also have a coating, for example, anti-reflective, scratch resistant, or tint. In one embodiment, the calculation system 1020 selects a frame that includes lenses having predetermined optical corrections, which may be selected based on the eye measurements. In another embodiment, the frames have plano lenses. The correction system 1020 may perform this selection based on inventory data. In one embodiment, the fabrication system 1030 maintains the inventory data and communicates it to the correction system 1020. Moving to step 1140, a correction is calculated based on the eye measurements. In one embodiment, the correction is also corrected based on the received frame selection. In one embodiment, the correction calculation system 1020 performs the calculation. The calculation may be performed with respect to the residual correction required in conjunction with the predetermined correction of the lenses of the selected frames. In one embodiment, the frames may be measured so that the correction can include a correction for residual errors introduced by the selected frames. The calculated correction may include corrections to low order, residual low order aberrations, high order aberrations, or any other type of correction disclosed herein. Next at step 1150, the calculated correction is applied to the lenses of the selected frames using a programmer such as those disclosed herein. For example, in one embodiment, a UV source selectively cures the thin layer of curable material to define a pattern of refraction corresponding to the calculated correction. The frames may then be dispensed to the patient and payment received.

Figure 12:
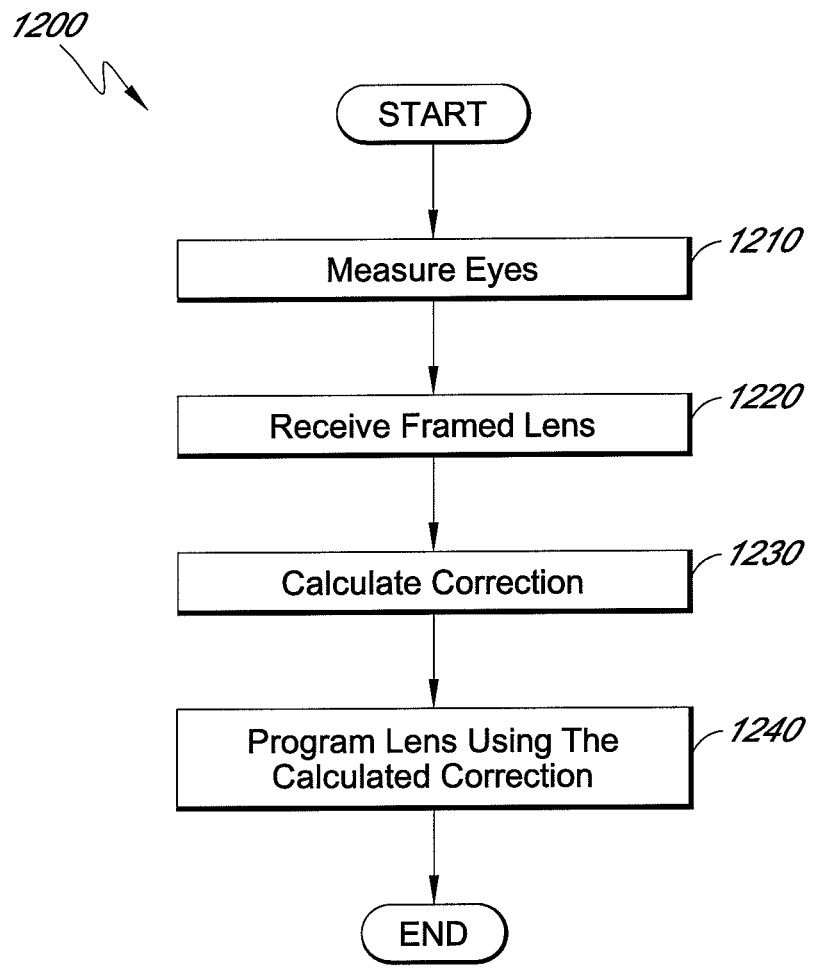
FIG. 12 is one embodiment of a method of producing customized framed lenses.

FIG. 12 is one embodiment of a method 1200 of producing customized framed lenses. Beginning at step 1210, a patient's vision parameters are measured, e.g., using the measurement system 1010. In other exemplary embodiments, the vision parameters are received via one or more of a computer network, a printed prescription, or a bar code associated with the vision parameters. Next at step 1220, framed lenses, such as spectacle frames having a pair of mounted lenses, are obtained. The mounted lenses may be obtained from a patient, or a stock of mounted lenses. In one embodiment, the patient provides the framed lens, e.g., an existing pair of eyeglasses. In one embodiment, the patient's vision is measured through the framed spectacles in step 1210. Moving to step 1230, a correction is calculated, for example, by the calculation system 1020, based on the vision parameters. In one embodiment, the correction can also be based on the framed lens. Proceeding to step 1240, the fabrication system 1030 programs the lens using the calculated correction. In one embodiment, a layer of material defining a surface contour is applied to the surface of the framed lenses to define a pattern of refraction on one or both lenses corresponding to the calculated correction. The calculated correction can include a correction to a low order aberration, a residual low order aberration, a high order aberration, a residual high order aberration, or combination of both. This embodiment is similar to that described in connection with FIG. 7B, except that the layer is applied to the framed lenses rather than to a mold. In another embodiment, a layer of material having a varying mixture of materials is applied to the framed lens to define a pattern of refraction corresponding to the calculated correction. This embodiment is similar to that described in connection with FIG. 7G, except that the layer is applied to the framed lenses rather than to a mold. Another embodiment may include applying a layer of photosensitive gel and programming a correction as described with reference to FIG. 9.

Another embodiment includes an optical element that provides a correction, or introduces, one or more high order aberrations. Certain embodiments may correct or introduce incremental values of one or more high order aberrations. Desirably such aberrations may include spherical aberration, trefoil, or coma. In one embodiment, the optical element is configured for use in a phoropter. An optician or other user may place the optical element in the optical path of a patient. The patient can then make a subjective determination as to whether the correction improves their vision. In another embodiment, the optical element comprises a framed spectacles lens. Such framed high order corrective lens may be stocked with the optical elements correcting one or more high order aberrations at various powers. A patient may select a frame and correction from a stock of frames, such as with reading glasses. Thus, a patient may easily obtain such lens for, e.g., use in a specific setting or task.

Another embodiment may include applying a layer of material that is cured such that a differential volume change during curing defines a pattern of refraction corresponding to the calculated correction. One such embodiment is described with reference to FIG. 13.

Figure 13:
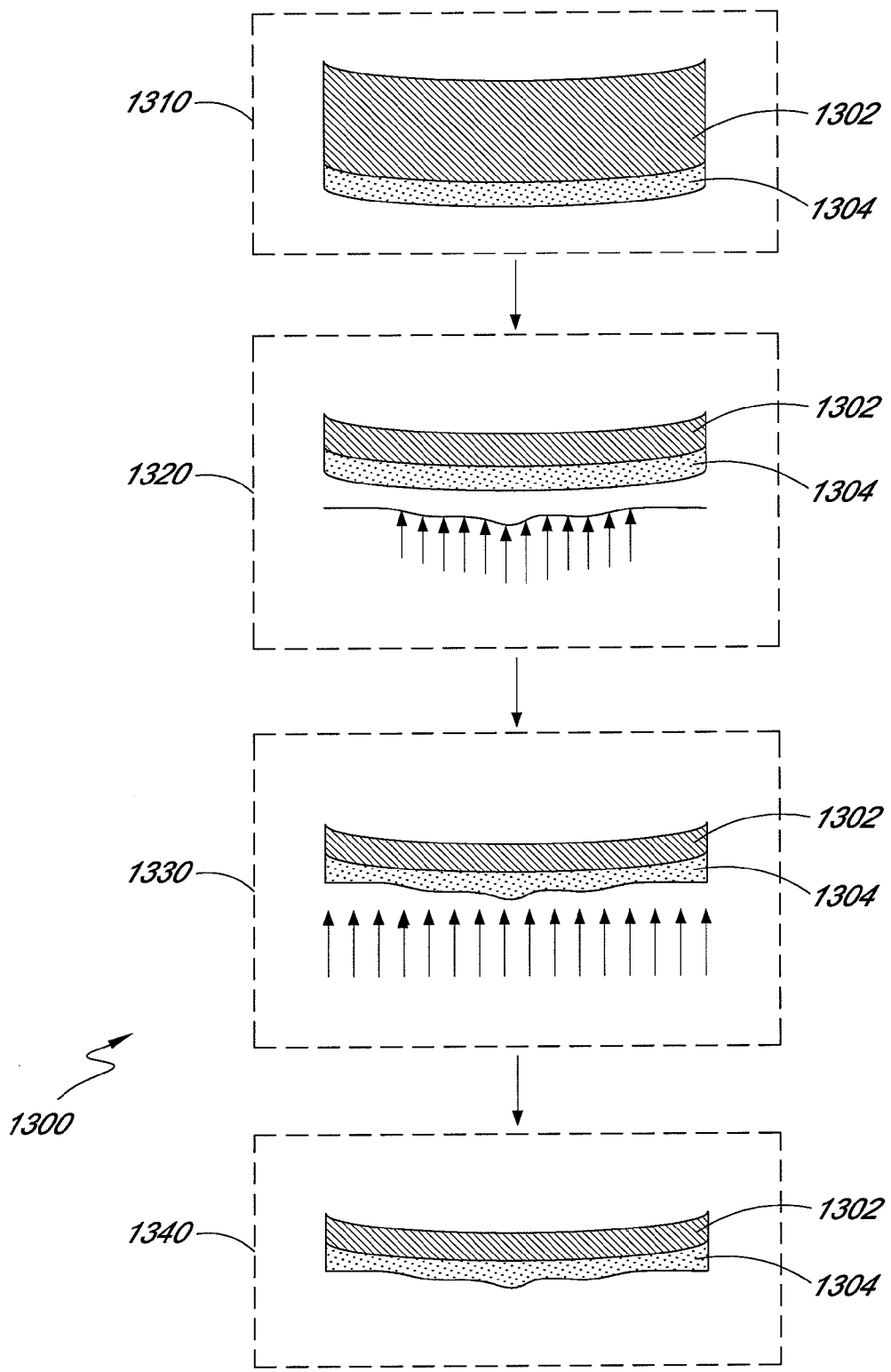
FIG. 13 graphically illustrates another embodiment of a method of manufacturing a lens having a layer with a varying thickness.

When appropriately cured, e.g., using high intensity light, polymers shrink, are substantially reduced in volume, in a predictable way. It has been found that a layer of such high volume material can be selectively cured so that the resulting layer exhibits a pattern of refraction that corrects both high and low order optical aberrations. FIG. 13 graphically illustrates another embodiment of a method 1300 of manufacturing a lens having a layer with a varying thickness. Beginning at block 1310, a lens assembly is made with an optical element 1302 and a high volume shrinkage monomer layer 1304. In one embodiment, the optical element 1302 having the high volume change monomer layer 1304 can be in a framed or mounted lens. In one embodiment, the optical element 1302 can be contoured, e.g., through grinding and polishing, to correct, e.g., low order aberrations. In another embodiment, the volume change of the monomer layer 1304 can correct a low order aberration. Next, as depicted in block 1320, the layer 1304 is exposed to a two-dimensional grayscale pattern of high intensity radiation. The radiation pattern can be generated using, for example, a light source and a photomask. This pattern of high intensity radiation causes variable shrinkage of the layer 1304 so as to vary the index of refraction across the layer 1304. The monomer composition may include materials such as those disclosed herein. Further, selection of appropriate compositions for the layer 1304 and the appropriate wavelength, duration, and intensity of radiation can include selections that are known in the art. The two dimensional grayscale pattern can be selected so as to form a layer 1304 that corrects one or more high order or low order aberrations. Moreover, the pattern of radiation can be further calculated to incorporate other features such as are described herein, including optical center, multiple optical centers, single correction zones, multiple correction zones, transition zone, blend zone, swim region, channel, add zones, vertex distance, segmental height, logos, invisible markings. Moving to block 1330, the layer 1304 may be exposed to approximately uniform low intensity radiation. The intensity, wavelength, and duration of this radiation can also be selected as is known in the art to complete curing of the polymer. The change in volume can also correct low order aberrations. Block 1340 depicts a cured lens. The cured lens may be further treated with optical coatings such as hard coatings, UV blocking coatings, anti-reflection, and scratch resistant coatings.

It is also to be appreciated that depending on the embodiment, the acts or events of any methods described herein can be performed in any sequence, can be added, merged, or left out all together (e.g., not all acts or events are necessary for the practice of the method), unless specifically and clearly stated otherwise. In addition, the methods described above can be used for making spherical, aspheric, single vision, bifocals, multifocal, progressive addition lens, atoric, intraocular lens, or other specialized lenses.

It will be understood that while certain embodiments are described herein with respect to providing customized vision in eyeglasses, other embodiments can include provide customized optical correction in other optical systems such as optical instruments. For example, optical instruments such a camera, telescope, binoculars, or microscope, may include a customized optical element. The customized optical element may be included as part of a configurable eyepiece, as an element in the instrument, or in addition to the eyepiece. The customized optical element may be configured to correct an optical path in the instrument including a viewfinder or sighting path, and the primary optical path of a camera, telescope, binoculars, microscope, or similar optical device. The customized optical element is configured to provide customized correction of the optical system such as described herein. In one embodiment, the customized optical element is configured to implement a lens definition including one or more optical aberrations and other vision parameters of at least one eye of a user. In another embodiment, the customized optical element is configured to correct one or more optical aberrations in the optical instrument. In yet another embodiment, the customized optical element is configured to both correct optical aberrations of the optical instrument and to include a lens definition for at least one eye of a user. In one embodiment, a layer of material, such as described above, is applied to a lens such as in an eyepiece and cured (if needed) to define a correction such as the lens definition on the lens. In one embodiment, the customized element is configured to include a customized lens definition for use with one eye of a user. In another embodiment, binoculars can be customized for each of the eyes of a user.

While the above detailed description has shown, described, and pointed out novel features of the invention as applied to various embodiments, it will be understood that various omissions, substitutions, and changes in the form and details of the device or process illustrated can be made by those skilled in the art without departing from the spirit of the invention. As will be recognized, the present invention can be embodied within a form that does not provide all of the features and benefits set forth herein, as some features can be used or practiced separately from others. The scope of the invention is indicated by the appended claims rather than by the foregoing description. All changes which come within the meaning and range of equivalency of the claims are to be embraced within their scope.

What is claimed is:

1. A method of making an optical lens comprising:
applying a spacer having a predetermined thickness to a first optical element;
applying a curable material to the first optical element;
debubbling the curable material;
positioning a portion of the curable material onto an off-center location of a second optical element;
mating the second optical element and the first optical element such that the curable material forms a layer having a thickness defined by the predetermined thickness of the spacer; and
curing the curable material to form a semi-cured material wherein the index of refraction of said semi-cured material can be selectively varied according to a lens definition.

2. The method of claim 1, wherein debubbling the curable material comprises placing the curable material into a vacuum chamber.

3. The method of claim 1, wherein at least one of the first and second optical elements comprises a thick optical element.

4. The method of claim 1, wherein at least one of the first and second optical elements comprises a thin optical element.

5. The method of claim 1, wherein at least one of the first and second optical elements comprises a lens.

6. The method of claim 1, wherein the act of mating further comprises applying a tape around the circumference of the first and second optical element so as to seal a cavity formed between the first optical element and the second optical element.

7. The method of claim 1, wherein applying a curable material further comprises:
    forming a substantially planar sheet of the curable material; and
    applying at least a portion of the substantially planar sheet of the curable material to the first optical element to form a layer of material having a selectively variable index of refraction according to the lens definition.

8. The method of claim 7, further comprising applying an optical coating to the first optical element.

9. The method of claim 8, wherein the optical coating comprises a layer of scratch-resistant material.

10. The method of claim 1 wherein curing the curable material further comprises selectively curing the curable material to vary the thickness of the semi-cured curable material so as to define a pattern of refraction that corrects at least one optical aberration.

11. The method of claim 10, wherein the selective curing is performed by low or high intensity radiation.

12. The method of claim 10, wherein applying a layer of curable material comprises vacuum forming the layer of curable material.

13. The method of claim 1 wherein
    applying a curable material further comprises vacuum forming the layer of curable material to the optical element, and wherein curing the curable material further comprises
    selectively curing the layer of curable material to define a pattern of refraction in the layer that corrects at least one high order optical aberration in an optical path through the lens.

14. The method of claim 1, wherein the making of an optical lens comprises fabricating an optical lens configured for use in an optical path of at least one of a camera, a telescope, binoculars, or a microscope.

15. The method of claim 1, wherein the lens definition comprises determining at least one of a low order aberration, a high order aberration, a high order correction zone, a transition zone, a swim zone, a channel, or a blend zone, and wherein the lens definition is based at least in part on at least one of a patient's vertex distance, pupil size, gaze, or x-y tilt.

16. The method of claim 7, wherein the lens definition comprises determining at least one of a low order aberration, a high order aberration, a high order correction zone, a transition zone, a swim zone, a channel, or a blend zone, and wherein the lens definition is based at least in part on at least one of a patient's vertex distance, pupil size, gaze, or x-y tilt.

17. The method of claim 4, wherein the method of making an optical lens further comprises freeform shaping or laser ablating a surface of the optical lens.

18. The method of claim 1, wherein the method of making an optical lens comprises forming at least one of a spherical, aspheric, single vision, bifocals, multifocal, progressive addition lens, atoric, or contact lens.

* * * * *